United States Patent
Yamaguchi et al.

(10) Patent No.: US 7,433,524 B2
(45) Date of Patent: Oct. 7, 2008

(54) PROCESSING SYSTEM WITH FRAME RATE AND IMAGE QUALITY OPTIMIZED

(75) Inventors: Yasushi Yamaguchi, Tottori (JP); Shoichi Teranaka, Ishikawa (JP); Yasunori Ishikawa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 625 days.

(21) Appl. No.: 10/840,368

(22) Filed: May 7, 2004

(65) Prior Publication Data

US 2005/0041875 A1   Feb. 24, 2005

(30) Foreign Application Priority Data

May 8, 2003 (JP) ............................. 2003-129807
May 8, 2003 (JP) ............................. 2003-129808

(51) Int. Cl.
*G06K 9/36* (2006.01)

(52) U.S. Cl. ....................... 382/233
(58) Field of Classification Search ............ None
See application file for complete search history.

(56) References Cited

U.S. PATENT DOCUMENTS

2002/0154823 A1* 10/2002 Okada ................ 382/233
2002/0181789 A1  12/2002 Okada
2003/0174769 A1*  9/2003 Nagumo et al. ........ 375/240.02

FOREIGN PATENT DOCUMENTS

| JP | 10-13794 | 1/1998 |
|---|---|---|
| JP | 10-308923 | 11/1998 |
| JP | 2001-309303 | 11/2001 |
| JP | 2002-10262 | 1/2002 |
| JP | 2002-51339 | 2/2002 |
| JP | 2002-359846 | 12/2002 |

* cited by examiner

*Primary Examiner*—Brian P. Werner
*Assistant Examiner*—Eueng-Nan Yeh
(74) *Attorney, Agent, or Firm*—Oblon, Spivak, McClelland, Maier & Neustadt, P.C.

(57) ABSTRACT

A motion image processing apparatus is disclosed. In the apparatus, a decoding part decodes frame data separated by a frame separating part based on the quality parameter. That is, a quality parameter calculating part calculates the frame data number possible to further store in a frame buffer obtained from an accumulated data volume detecting part, and a decode quality updating part updates the quality parameter for the decoding part. Moreover, a frame location determining part determines a next frame location to process based on the frame data number, and the frame location updating part indicates the next frame location to a frame separating part.

16 Claims, 20 Drawing Sheets

FIG.3
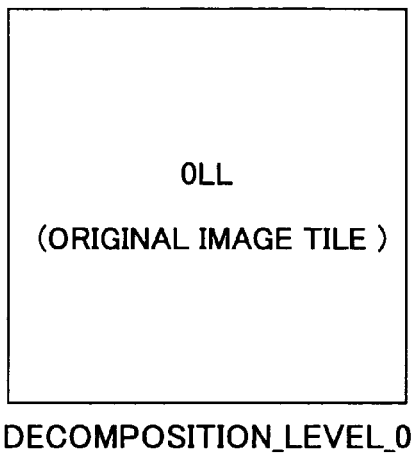
DECOMPOSITION_LEVEL_0
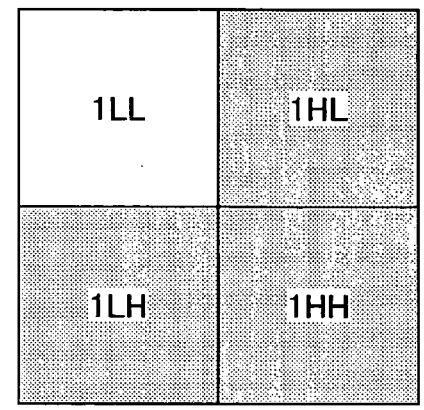
DECOMPOSITION_LEVEL_1
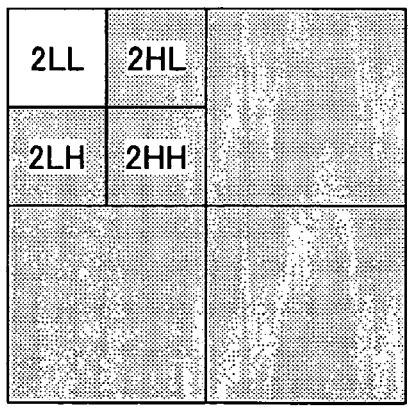
DECOMPOSITION_LEVEL_2
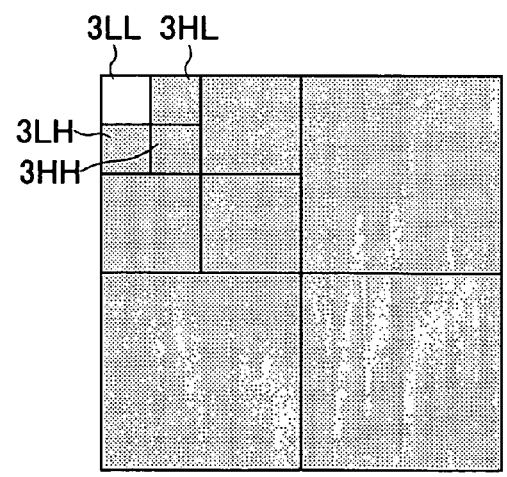
DECOMPOSITION_LEVEL_3

PROCESSING SYSTEM WITH FRAME RATE AND IMAGE QUALITY OPTIMIZED

BACKGROUND OF THE INVENTION

1. Field of the Invention

The present invention generally relates to a motion image processing apparatus, a computer readable recording medium recorded with program code for causing a computer a computer to process a motion image, and a motion image processing method, that reproduce motion image data being compressed by using a digital motion image compressing method for conducting an image compressing process only for information within a frame.

2. Description of the Related Art

Generally, in a case of transmitting and accumulating digital motion image data, the digital motion image data are compressed into functional tenths by using a digital motion image compressing and decompressing technology so as to reduce a transmission rate and an accumulated amount of data. As this digital motion image compressing and decompressing technology, MPEG 1, MPEG 2, and MPEG 4 are used for a motion image only and Motion JPEG handling a still image as a sequence of successive frames is used.

The Motion still image coding method handles only a coding process within each frame. The MPEG method handles not only images within the same frame but also correlates between images among different frames, so that compression is further effectively conducted. On the other hand, the motion still image coding method, which separately handles each of the frames, can edit for each frame, which cannot be possible in the MPEG method. In addition, a transmission error occurring in one frame does not affect other frames. As described above, the MPEG method and the Motion still image coding method haves features, respectively. Either one is used approximately for each application.

Recently, for the Motion still image coding method, a new method called Motion JPEG 2000, which compresses and codes image data by using a discrete wavelet transform is standardized.

However, since many coding methods such as the MPEG method and the Motions still image coding method process an image per block unit, deterioration such as a block noise and an edge noise occurs when the image is decoded. The block noise is a distortion seen as geometric patters being a block pattern, which do not exist in an original image. And the edge noise is a distortion being a ringing shape and occurring in a vicinity of edges (called a mosquito noise).

Conventionally, a post filter has been provided to eliminate noises peculiar to these coding methods. Schematically, this post filter conducts processes for smoothing a decoding image signal, and eliminating a high component at a boundary portion between blocks.

However, a filtering process such as the above-described post filter relatively requires a large amount of operations. Since the filter process consumes a time, a reproducing process is delayed as a result. Especially, in a system conducting a software decoding process on a microprocessor basis, a processor resource is occupied by the decoding process alone for a scene of a vigorous movement and a workload of the processor is increased. Then, a delay is frequently caused in the reproducing process. The delay in the reproducing process is actualized especially when a decoding process and the reproducing process are conducted with respect to a motion image by synchronizing a voice by software. Accordingly, a mismatch with a voice and a drop frame occur.

That is, when the delay occurs in the reproducing process of the motion image, generally, in order to solve the delay, a frame skip is conducted to omit the decoding process with respect to some frames. As a result, the drop frame occurs. Then, a reproduced motion image shows an awkward movement. Especially, in the Motion JPEG 2000 in that a high compression rate and a high quality of the image can be obtained, since a large amount of operations is required more than the image process of the Motion JPEG, the drop frame becomes remarkable.

In order to eliminate such these problems, the Japanese Laid-Open Patent Application No. 2001-309303 discloses a technology related to a real time picture recording and reproducing device using a digital motion image compressing and decompressing process in that a frame rate controlling part is included, an interpolating process is conducted when a compressing process cannot be conducted in time, and a frame dropping process is conducted when a decompressing process cannot be in time. In particular, the frame dropping process during the decompressing process is conducted preferentially with respect to frames for which the interpolating process is conducted during the compressing process.

However, according to the technology disclosed in the Japanese Laid-Open Patent Application No. 2001-309303 above-described, the interpolating process during the compressing process is substantially a thinning out process. As a result, a frame rate is deteriorated. Actually, a real time operation is maintained by deteriorating the frame rate by thinning out the frames. Accordingly, the motion image displayed at a display unit is an image which movement is not smooth.

SUMMARY OF THE INVENTION

It is a general object of the present invention to provide a motion image processing apparatus, a computer-readable recording medium recorded with program code for causing a computer to process a motion image, and a motion image processing method in which the above-mentioned problems are eliminated.

A more specific object of the present invention is to the motion image processing apparatus, the computer-readable recording medium recorded with program code for causing a computer to process a motion image, and the motion image processing method, in which a motion image reproduction can be smoothly conducted without causing a drop frame due to a delay of a reproducing process.

The above objects of the present invention are achieved by a motion image processing apparatus for reproducing motion image data being compressed by a digital motion image compressing method for conducting an image compressing process by information in a frame, the motion image processing apparatus comprising: a frame separating part sequentially separating and outputting frame data forming the motion image data every one frame; a decoding part conducting a decoding process for the frame data output by the frame separating part; a frame buffer maintaining the frame data decoded by the decoding part and sequentially outputting from older frame data in a chronological order; an accumulated data volume detecting part detecting a first number of sets of the frame data maintained in the frame buffer, and obtaining a second number of sets of the frame data possible to further store in the frame buffer; a quality parameter calculating part calculating a quality parameter used to determine a decode quality at the decoding process conducted by the decoding part, based on the second number of sets of the frame data possible to further store in the frame buffer, the second number obtained from the accumulated data volume detecting part; and a decode quality updating part indicating the decoding part to update the quality parameter calculated by the quality parameter calculating part.

According to the present invention, while the decoding part conducts the decoding process for the frame data separated by the frame separating part based on the quality parameter, the quality parameter is calculated based on the second number of sets of frame data possible to further store in the frame buffer obtained from the accumulated data volume detecting part, and is updated by the decode quality updating part for the decoding part. Therefore, it is possible to adaptively control an image quality by corresponding to a performance ability of the decoding process. In principle, it is possible to realize a real time decoding process by adjusting the image quality while maintaining the frame rate, without an occurrence of the frame drop due to a time delay of reproduction. Furthermore, it is possible to maintain the image quality and the frame rate as much as possible. That is, it is possible to realize a smooth motion image reproduction without the occurrence of the frame drop due to the time delay of the reproduction.

In the motion image processing apparatus, the quality parameter calculating part may include: a first part determining the quality parameter as a highest quality when a frame data number D showing an extra number of sets of the frame data that can be additionally maintained in the frame buffer is greater than a first threshold (D>first threshold) the frame data number obtained from the accumulated data volume detecting part; a second part determining the quality parameter as a lowest quality when the frame data number is smaller than a second threshold (D<second threshold), the frame data number obtained from the accumulated data volume detecting part; and a third part gradually determining the quality parameter by corresponding to the frame data number D when the frame data number is smaller than the first threshold and greater than the second threshold (second threshold<D<first threshold), the frame data number obtained from the accumulated data volume detecting part.

According to the present invention, it is possible to determine the quality parameter by a simple process, based on the second number of sets of frame data possible to further store in the frame buffer obtained by the accumulated data volume detecting part.

The above objects of the present invention are achieved by a motion image processing apparatus for reproducing motion image data being compressed by a digital motion image compressing method for conducting an image compressing process by information in a frame, the motion image processing apparatus comprising: a frame separating part sequentially separating and outputting frame data forming the motion image data every one frame; a decoding part conducting a decoding process for the frame data output by the frame separating part; a frame buffer maintaining the frame data decoded by the decoding part and sequentially outputting from older frame data in a chronological order; an accumulated data volume detecting part detecting a first number of sets of the frame data maintained in the frame buffer, and obtaining a second number of sets of the frame data possible to further store in the frame buffer; a frame location determining part determining a next frame location to process, based on the second number of sets of the frame data possible to further store in the frame buffer, the second number obtained from the accumulated data volume detecting part; and a frame location updating part indicating the frame location determined by the frame location determining part, to the frame separating part.

According to the present invention, while the decoding part conducts the decoding process for the frame data separated by the frame separating part based on the quality parameter, the frame location determining part determines the next frame location to process based on the second number of sets of frame data possible to further store in the frame buffer obtained from the accumulated data volume detecting part, and the frame location updating part indicates the next frame location to the frame separating part. Therefore, it is possible to adaptively control an image quality by corresponding to a performance ability of the decoding process. In principle, it is possible to realize a real time decoding process by adjusting the image quality while maintaining the frame rate, without an occurrence of the frame drop due to a time delay of reproduction. Furthermore, it is possible to maintain the image quality and the frame rate as much as possible. That is, it is possible to realize a smooth motion image reproduction without the occurrence of the frame drop due to the time delay of the reproduction.

In the motion image processing apparatus, the frame location determining part may include calculating a number of frames to drop when a frame data number D showing an extra number of sets of the frame data that can be additionally maintained in the frame buffer is smaller than a second threshold (D<second threshold), the frame data number obtained from the accumulated data volume detecting part, and determining a next frame location by advancing by the number of frames.

According to the present invention, it is possible to drop frames only when the second number of sets of frame data possible to further store in the frame buffer obtained by the accumulated data volume detecting part.

In the motion image processing apparatus, the digital motion image compressing method is a Motion JPEG 2000 method.

According to the present invention, it is possible to obtain a higher compression rate and a motion image having a higher image quality.

The above objects of the present invention are achieved by a motion image processing apparatus for reproducing motion image data being compressed by a digital motion image compressing method for conducting an image compressing process by information in a frame, the motion image processing apparatus including: a frame separating part sequentially separating and outputting frame data forming the motion image data every one frame; a decoding part conducting a decoding process for the frame data output by the frame separating part; a decode time detecting part obtaining a decode process time of one set of the frame data, the decode process time required for the decoding part to conduct the decoding process; a quality parameter calculating part calculating a quality parameter used to determine a decode quality at the decoding process by the decoding part based on the decode process time obtained from the decode time detecting part; a frame location determining part determining a next frame location to process, based on an expected time of the decoding process corresponding to the quality parameter calculated by the quality parameter calculating part and an actual decoding process time of the frame; a decode quality updating part updating the quality parameter calculated by the quality parameter calculating part for the decoding part; and a frame location updating part indicating the next frame location determined by the frame location determining part for the frame separating part.

According to the present invention, while the decoding part conducts the decoding process for the frame data separated by the frame separating part based on the quality parameter, the quality parameter calculating part calculate the quality parameter based the decode process time of the frame data for one frame obtained by the decode time detecting part, and the decode quality updating part updates the quality parameter for the decoding part. Moreover, the frame location determining part determines the next frame location to process based on the expected time of the decoding process corresponding to the quality parameter calculated by the quality parameter calculating part and the actual decoding process time of the frame. Then, the frame location updating part indicates the next frame location to the frame separating part. Therefore, it is possible to adaptively control the image quality corresponding to the performance ability of the decoding process. In principle, it is possible to realize a real time decoding process by adjusting the image quality while maintaining the frame rate, without an occurrence of the frame drop due to a time delay of reproduction. Furthermore, it is possible to maintain the image quality and the frame rate as much as possible. That is, it is possible to realize a smooth motion image reproduction without the occurrence of the frame drop due to the time delay of the reproduction.

The above objects of the present invention can be achieved by a program code for causing a computer to conduct processes described above in the motion image processing apparatus or by a computer-readable recording medium recorded with the program code.

BRIEF DESCRIPTION OF THE DRAWINGS

In the following, embodiments of the present invention will be described with reference to the accompanying drawings.

FIG. 3 is a diagram illustrating sub bands in each of decomposition levels in a case in that the number of the decompositions is three;

DESCRIPTION OF THE PREFERRED EMBODIMENTS

In the following, embodiments according to the present invention will be described with reference to the accompanying drawings.

[Overview]

First, overviews of "Hierarchical coding algorithm" and "JPEG 2000 Algorithm" will be described as assumptions of the present invention.

Figure 1:
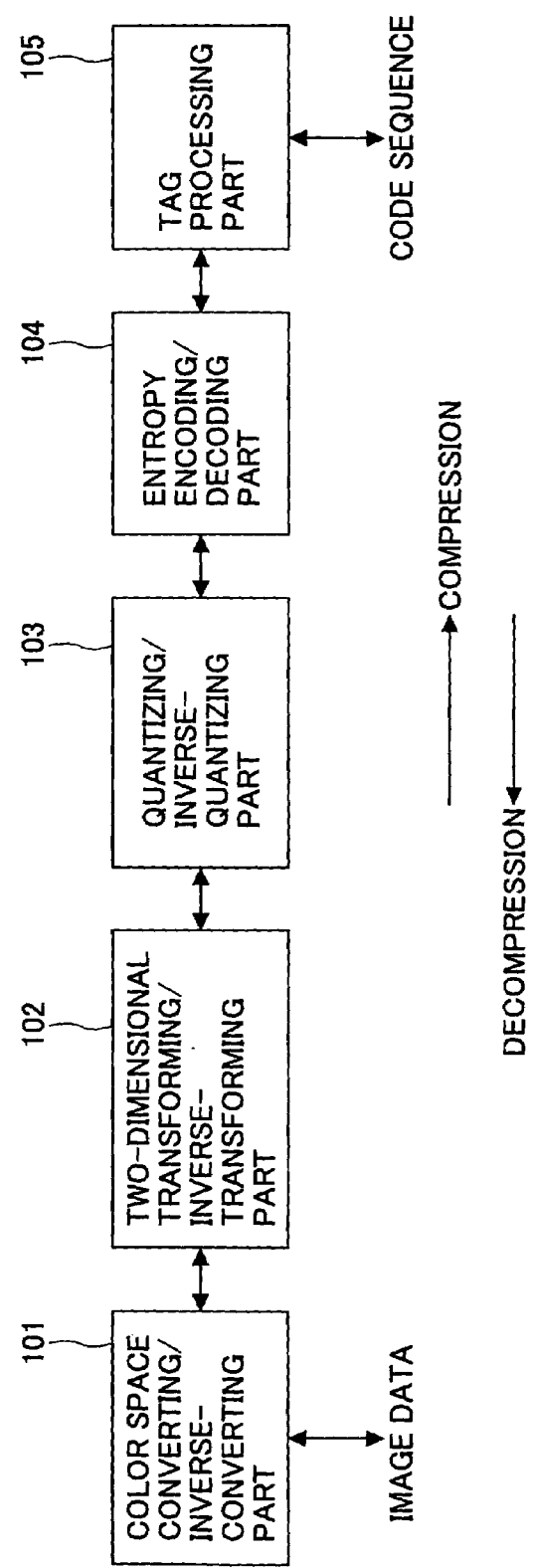
FIG. 1 is a functional block diagram of a system realizing the hierarchical coding algorithm as a basic of a JPEG 2000 method.

FIG. 1 is a functional block diagram of a system realizing the hierarchical coding algorithm as a basic of a JPEG 2000 method. The system includes a color space converting/inverse-converting part 101, a two-dimensional wavelet transforming/inverse-transforming part 102, a quantizing/inverse-quantizing part 103, an entropy encoding/decoding part 104, and a tag processing part 105.

One of the most different point from a conventional JPEG algorithm in this system is a converting method. JPEG uses a DCT (Discrete Cosine Transform) However, this hierarchical coding algorithm uses a DWT (Discrete Wavelet Transform) in the two-dimensional wavelet transforming/inverse-transforming part 102. Compared with the DCT, the DWT has an advantage of a higher image quality in a high compressed area. This point is the main reason why the DWT is applied to JPEG 2000, which is a succeeding technology of JPEG.

Moreover, as another big different point, the tag processing part 105 is additionally provided to conduct a code formation at a last stage of the system in the hierarchical coding algorithm. The tag processing part 105 generates compressed data as a code sequence data at when a compressing operation is conducted for an image, and reads the code sequence data necessary to decompress by a decompressing operation. Then, JPEG 2000 becomes possible to realize various useful functions by this code sequence data. For example, it is possible to stop a compressing/decompressing operation for a still image at any time at an arbitrary level (decomposition level) corresponding to an octave division by the DWT at a block base (refer to FIG. 3).

The color space converting/inverse-converting part 101 is often connected at an input/output part for an original image. For example, the color space converting/inverse-converting part 101 corresponds to a part for conducting a conversion or an inverse-conversion from an RGB color system formed by components corresponding to R (Red), G (Green), and B (Blue) of an original color system and a YMC color system formed by components corresponding to Y (Yellow), M (Magenta, and C (Cyan) into a YUV or YcbCr color system.

Next, the JPEG algorithm will be described.

Figure 2:
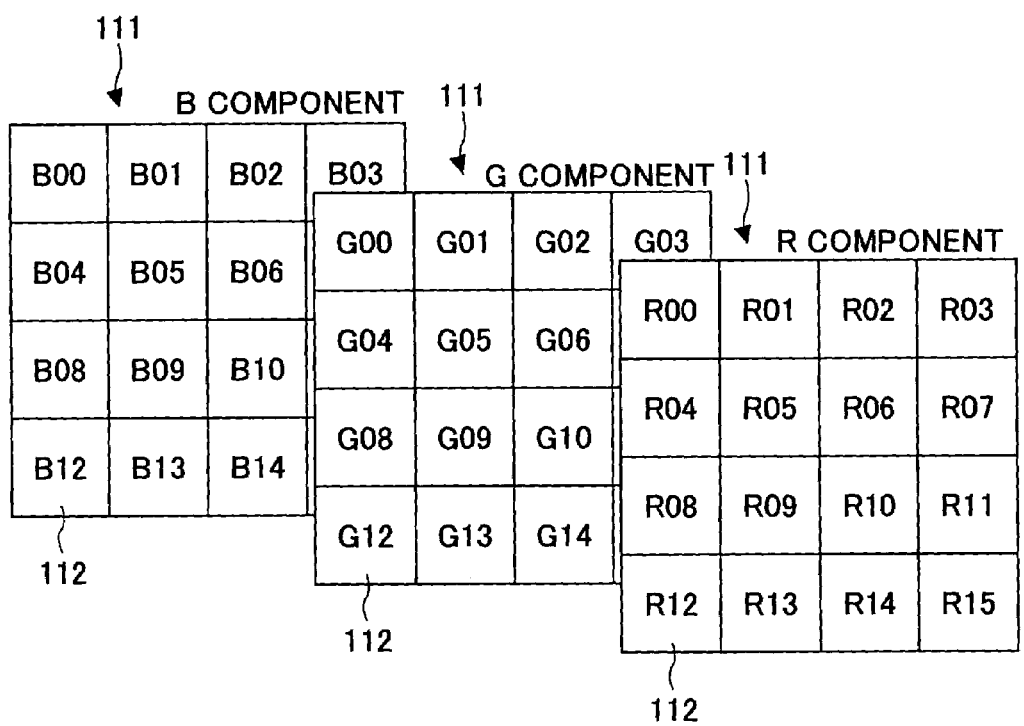
FIG. 2 is a diagram illustrating divided rectangle areas for each of components of an original image.

In general, as shown in FIG. 2, each of components 111 (RGB original color system) of the original image is divided into rectangle areas for a color image. These divided rectangle areas are generally called blocks or tiles. Since these divided rectangle areas are generally called tiles in JPEG 2000, hereinafter, the divided rectangle areas are referred as the tiles (in an example in FIG. 2, each of components 111 is divided into 4×4 tiles, that is, total 16 rectangle tiles 112). Each of tiles 112 (in FIG. 2, R00, R01, R15/G00, G01, . . . , G15/B00, B01, . . . , B15) becomes a basic unit during the compressing/decompressing operation for image data. Accordingly, the compressing/decompressing operation for the image data is independently conducted for each component and each tile 112.

When the image data is coded, data of each tile 112 of each component 111 is input to the color space converting/inverse-converting part 101 shown in FIG. 1, and after a color space conversion is conducted, a two-dimensional wavelet transform (forward conversion) is conducted by the two-dimensional wavelet transforming/inverse-transforming part 102. Accordingly, the data are divided into a space of frequency bands.

FIG. 3 shows sub bands in a case in that the number of decomposition levels is three. That is, the two-dimensional wavelet transform is conducted with respect to an original image tile (OLL) (decomposition level 0) obtained by dividing the original image into tiles so as to decompose into sub bands (1LL, 1HL, 1LH, 1HH) shown in a decomposition level 1. Subsequently, the two-dimensional wavelet transform is conducted with respect to a low frequent element 1LL in this level so as to decompose the low frequent element 1LL into sub bands (2LL, 2HL, 2LH, 2HH) shown in a decomposition level 2. Similarly, the two-dimensional wavelet transform is conducted with respect to a low frequency element 2LL so as to decompose the low frequency element 2LL into sub bands shown in a decomposition level 3. In FIG. 3, sub bands subjected to code in each decomposition level are indicated by a half-tone dot meshing. For example, when the number of the decomposition levels is three, the sub bands (3HL, 3LH, 3HH, 2HL, 2LH, 2HH, 1HL, 1LH, 1HH) are coded but the sub band 3LL is not coded.

Next, bits subjected to code are defined in an order of indicated coding processes, and a context is generated from bits peripheral to bits subjected by the quantizing/inverse-quantizing part 103 shown in FIG. 1.

Figure 4:
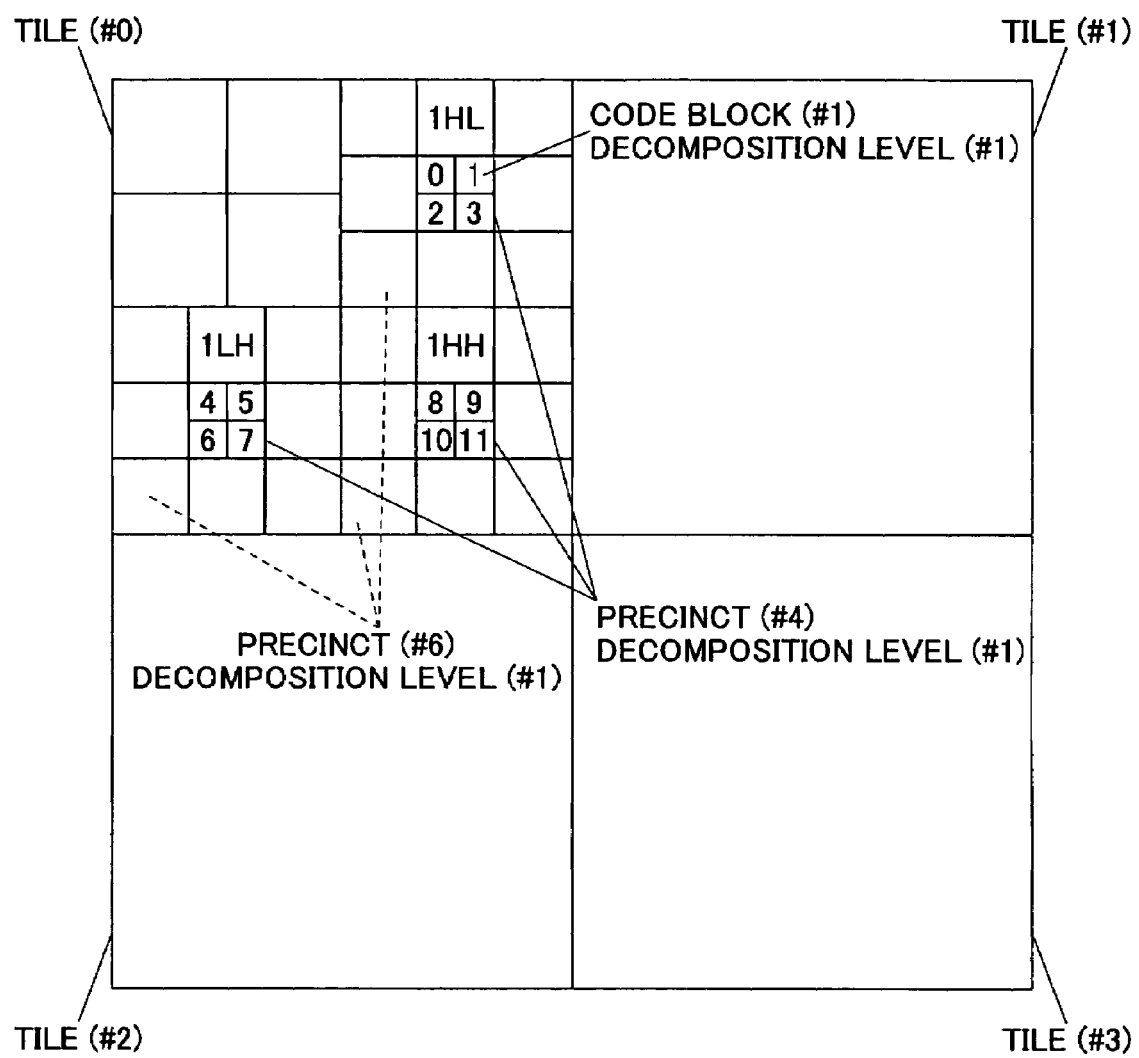
FIG. 4 is a diagram showing precincts.

A wavelet coefficient used in this quantizing process is divided into rectangle areas, which are called "precinct" and are not duplicated, for each sub band. This process is installed to effectively use a memory at an implementation. As shown in FIG. 4, one precinct is formed by three rectangle areas spatially corresponded each other. Moreover, each precinct is divided into rectangle "code blocks" that are not duplicated each other. The rectangle "code block" is a basic unit to conduct an entropy coding process.

A coefficient value after the wavelet transform can be quantized and coded. Alternatively, in order to improve a coding efficiency in JPEG 2000, the coefficient value is decomposed into "bit plane" units and the "bit planes" can be placed in the order for each pixel or each code block.

Figure 5:
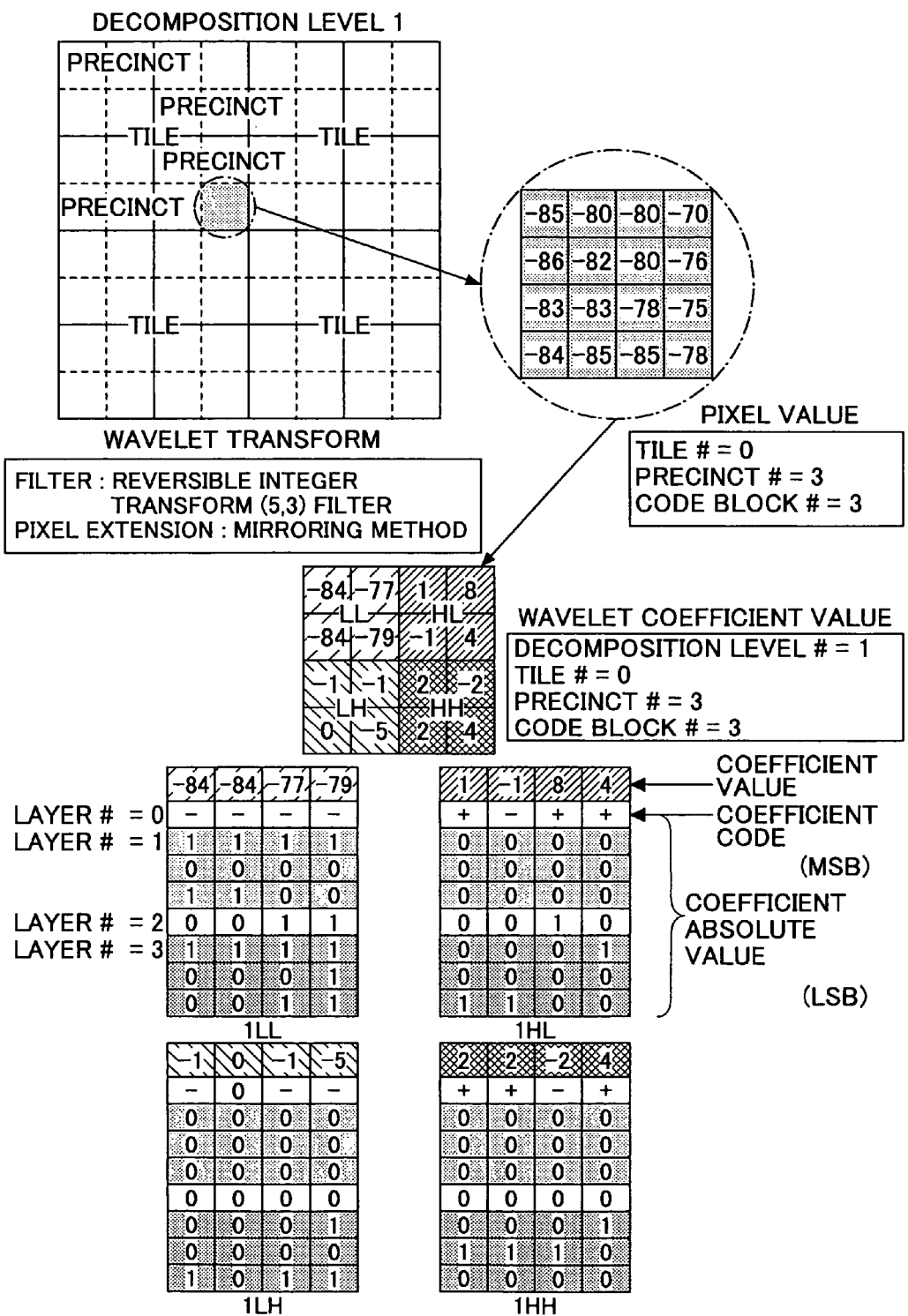
FIG. 5 is a diagram illustrating an example of a procedure for placing the bit planes in the order.

FIG. 5 is a diagram illustrating a procedure for placing bit planes in the order. As shown in FIG. 5, the original image (32×32 pixels) are divided into four tiles of 16×15 pixels, and the size of the precinct of the decomposition level 1 and the size of the code block are 8×8 pixels and 4×4 pixels, respectively. The precinct and the code block are numbered in a raster order. In this example, the precincts are numbered from 0 to 3 and the code blocks are numbered from 0 to 3. A mirroring method is used for a pixel enlargement outside a tile boundary, and the wavelet transform is conducted by a reversible 5:3 filter. As a result, the wavelet coefficient value of the decomposition level is obtained.

In addition, in FIG. 5, an example of a concept of a typical "layer" configuration is illustrated for a tile 0/precinct 3/code block 3. After the wavelet transform, the code block is divided into sub bands (1LL, 1HL, 1LH, 1HH), and a wavelet coefficient value is assigned for each sub band.

The layer configuration can be easily understood by seeing the wavelet coefficient value in a lateral direction. One layer is formed by arbitrary bit planes. In this example, layers 0, 1, 2, and 3 are formed by bit planes 1, 3, 1, and 3, respectively. A layer having a bit plane closer the LSB (Least Significant Bit) is subjected to quantize, and a layer closer the MSB (Most Significant Bit) is remained. A method for discarding a layer having closer the LSB is called a truncation, and can conduct a fine control for a quantization ratio.

The entropy encoding/decoding part 104 shown in FIG. 1 encodes the tiles 112 of each of the components 111 by a probability estimation from the contexts and the subject bits. Accordingly, a coding process is conducted with respect to all components 111 of the original image for each tile 112. Finally, the tag processing part 105 joins all coded data output from the entropy encoding/decoding part 104 so as to make a single set of code sequence data, and conducts a process for additionally providing a tag to the single set of code sequence data.

Figure 6:
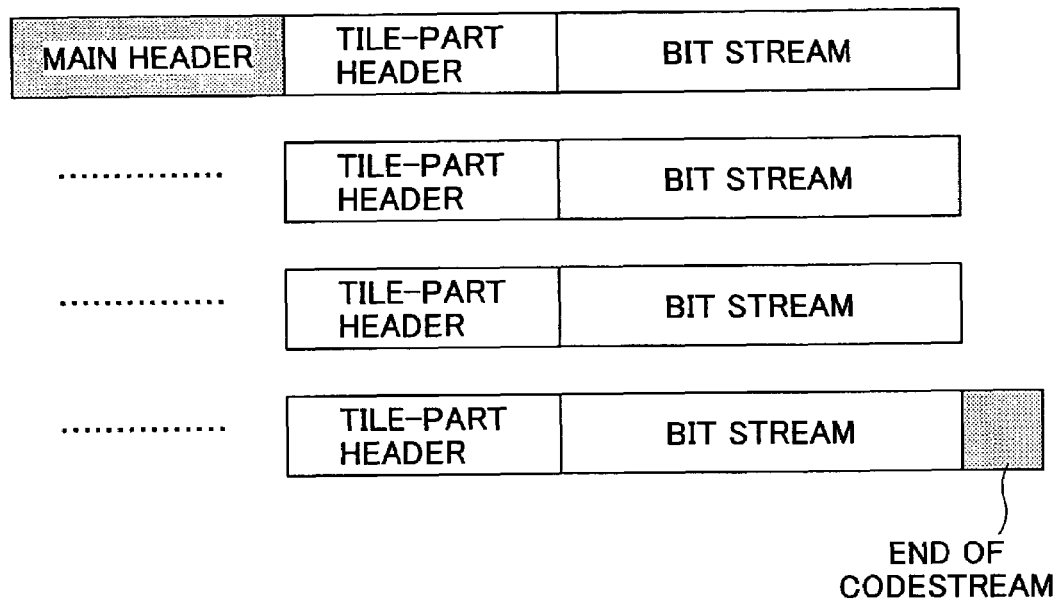
FIG. 6 is a diagram showing a schematic configuration of one frame of code sequence data.
Figure 7:
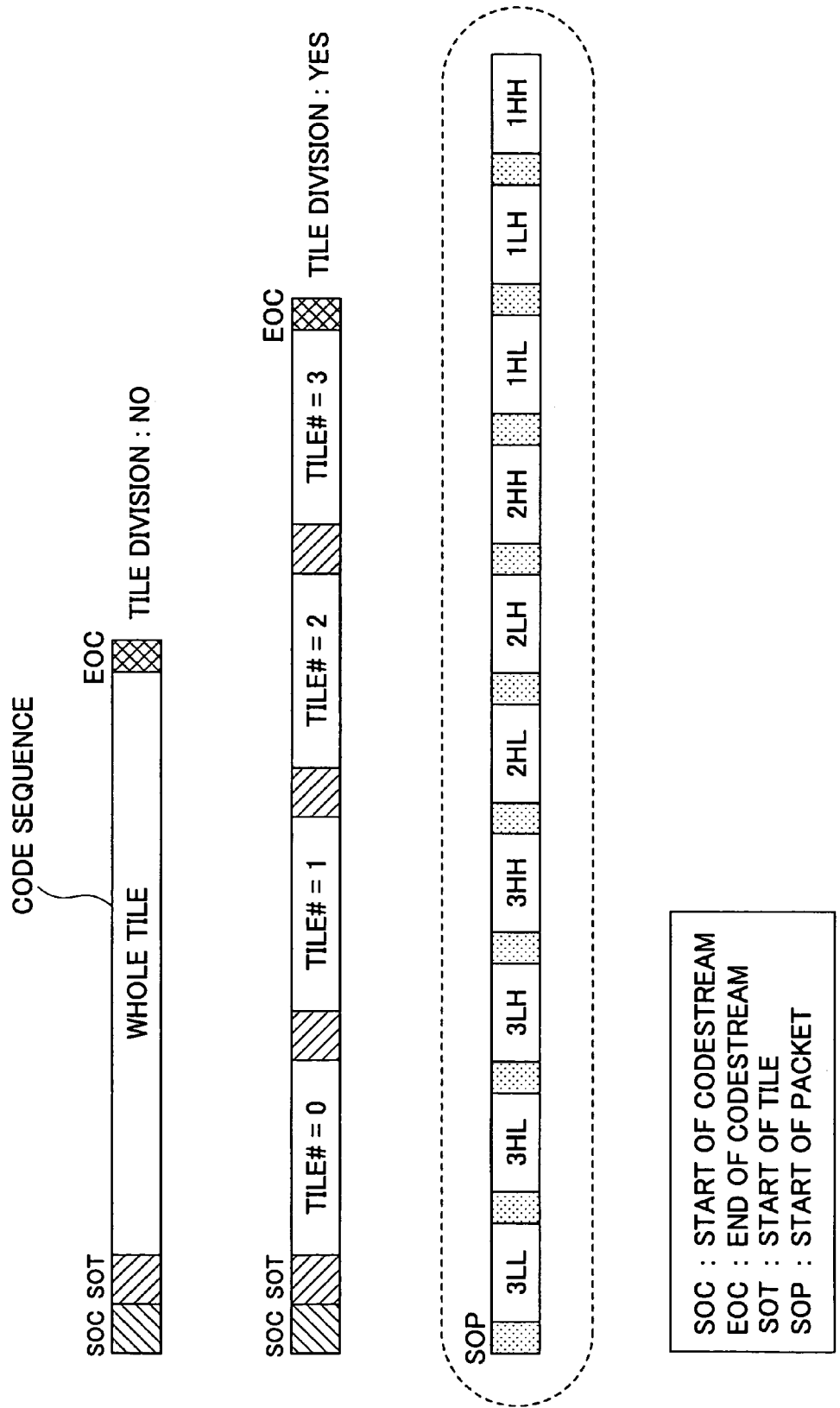
FIG. 7 is showing a code stream configuration for each sub band for a packet in which a wavelet coefficient value being coded is accommodated.

FIG. 6 is a diagram schematically showing a configuration of the code sequence data for one frame. At a beginning of the code sequence data and a beginning of the code data (bit stream) of each tile, a header (main header) and tag information called a tile part header showing tile boundary location information are additionally provided. After that, the coded data of each tile follow. It should be noted that code parameters and quantization parameters are described in the main header. Then, a tag (end of codestream) is provided at an end of the code sequence data. Moreover, FIG. 7 is a diagram illustrating a configuration of the code stream in that a packet accommodating the wavelet coefficient value being coded is shown for each sub band. As shown in FIG. 7, in both cases in that a dividing process is conducted by the tile and in that the dividing process is not conducted by the tile, a similar configuration of a packet sequence is formed.

On the other hand, when the coded data are decoded, the image data are generated from the code sequence data of each tile 112 of each component 111 by conducting a decoding process in a reversed order of coding the image data. In this case, the tag processing part 105 reads the tag information provided to the code sequence data, which are externally input, decomposes the code sequence data into code sequence data of each tile 112 of each component 111, and conducts the decoding process (extending process). At this time, a location of a bit subjected to decode sequentially based on the tag information in the code sequence data is defined, and a context is generated from an arrangement of peripheral bits (already decoded) at the location of the subjected bit by the quantizing/inverse-quantizing part 103. The entropy encoding/decoding part 104 conducts a decoding process by the probability estimation from this context and the code sequence data to generate a subject bit, and places the subject bit at the location of the subject bit. Since data being decoded are spatially divided for each frequency band, each tile of each component of the image data is decoded by conducting the two-wavelet inverse-transform by the two-dimensional wavelet transforming/inverse-transforming part 102. The data being decoded are converted into the image data of an original color system by the color space converting/inverse-converting part 101.

Figure 8:
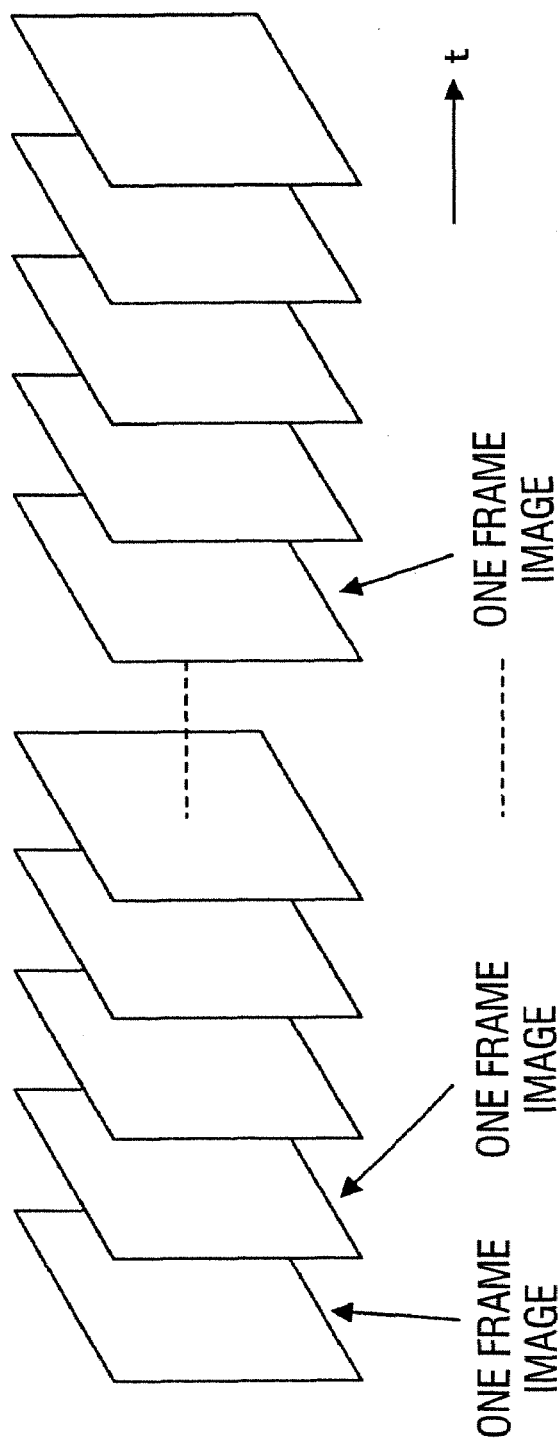
FIG. 8 is a schematic diagram showing Motion JPEG 2000.

"JPEG 2000 algorithm" is described above. "Motion JPEG 2000 algorithm" is a method in that the method for the still image, that is, a single frame is extended to a plurality of frames. That is, "Motion JPEG 2000" realizes a motion image by successively displaying frames of a JPEG 2000 image one by one at a predetermined frame rate (indicating the number of frames to reproduce within a unit time), as shown in FIG. 8.

First Embodiment

A first embodiment will be described in the following. In the first embodiment, examples related to a motion image compressing/decompressing technology representing JPEG 2000 will be explained. However, the present invention is not limited to the following explanations.

Figure 9:
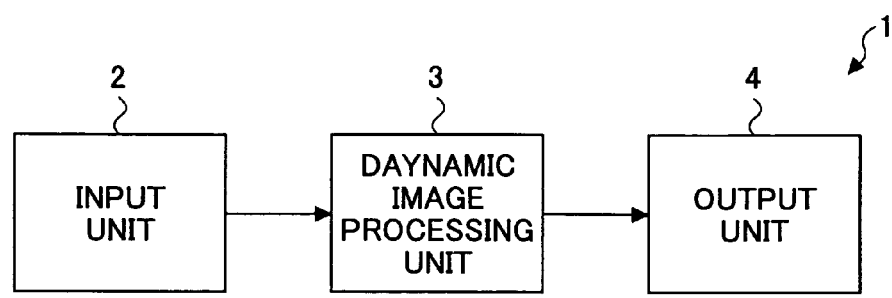
FIG. 9 is a block diagram showing an entire configuration of a motion image outputting system according to a first embodiment of the present invention.

FIG. 9 is a block diagram showing an entire configuration of a motion image outputting system according to the first embodiment of the present invention. As shown in FIG. 9, the motion image outputting system 1 includes an input unit 2 for inputting compressed motion image data to a motion image processing unit 3, the motion image processing unit 3 for decompressing the compressed motion image data input from the input unit 2, and an output unit 4 for outputting motion image data being decompressed by the motion image processing unit 3.

In detail, the input unit 2 may be one of various communication interfaces for sending the compressed motion image data to the motion image processing unit 3, a storage unit for storing the compressed image data, a motion image input unit such as a video camera for inputting motion image, or the like. The compressed motion image data output from input unit 2 to the motion image processing unit 3 are Motion JPEG 2000 data being compressed and coded in accordance "Motion JPEG 2000 algorithm".

In detail, the output unit 4 may be one of various communication interfaces for receiving the motion image data decomposed by the motion image processing unit 3, a display such as a LCD (Liquid Crystal Display) for displaying a motion image being decomposed and a CRT (Cathode Ray Tube), or a like.

Figure 10:
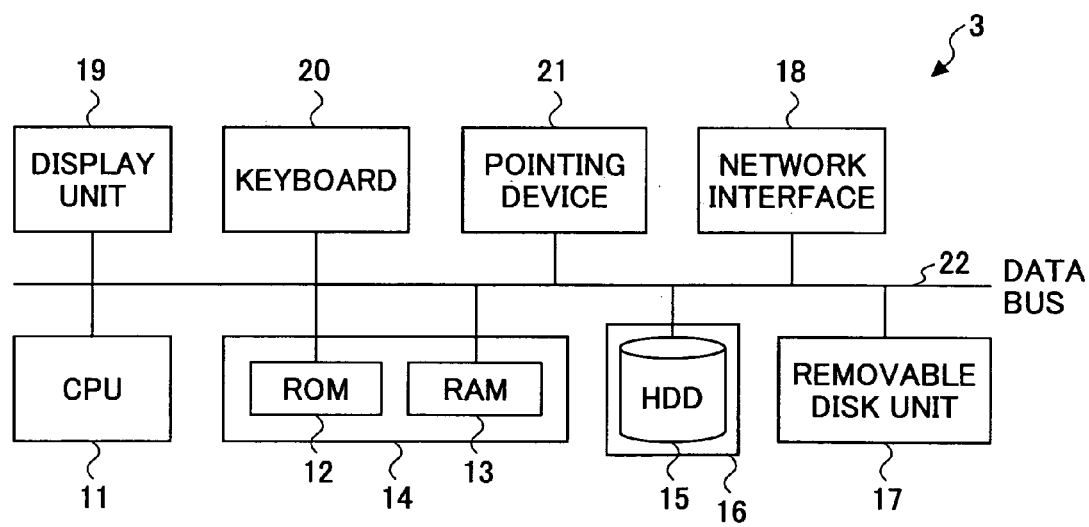
FIG. 10 is a diagram showing a module configuration of a motion image processing unit according to the first embodiment of the present invention.

Next, the motion image processing unit 3 will be described in detail. FIG. 10 is a diagram showing a module configuration of the motion image processing unit according to the first embodiment of the present invention. The motion image processing unit 3 is a personal computer and includes a CPU (Central Processing Unit) 11 for conducting an image process, a main storage unit 14 such as a ROM (Read Only Memory) 12 for storing information and a RAM (Random Access Memory) 13, an auxiliary storage unit 16 such as a HDD (Hard Disk Drive) 15 as a storing part for storing compressed codes that will be described later, a removable disk unit 17 such as a CD-ROM drive for storing information, distributing information to an outside, and obtaining information from the outside, a network interface 18 for communicating information with the input unit 2 and the output unit 4, a display unit 19 such as the CRT (Cathode Ray Tube) and the LCD (Liquid Crystal Display) for displaying a user a process progress and result, a keyboard 20 for the user to input an instruction and information to the CPU 11, and a pointing device 21 such as a mouse, in which a bus controller 22 controls data to send and receive among units 11, 14, 16, 17, and 19, the network interface 18, the keyboard 20, and the pointing device 21. In this embodiment, the display unit 19 of the motion image processing unit 3 functions as the output unit 4.

In the motion image processing unit 3, the CPU 11 activates a program called a loader resided in the ROM 12 when the user turns on, a program called an operating system for managing hardware and software of a computer is read from the HDD 15 and loaded to the RAM 13, and then the operating system is activated. The operating system activates a program in response to an operation of the user, reads information, and stores the information. As typical operating systems, Windows™, UNIX™, and the like are well known. Programs capable of running on these operating systems are called an application program.

The motion image processing unit 3 stores a motion image processing program as an application program in the HDD 15. In this meaning, the HDD 15 functions as a storing medium for storing the motion image processing program.

Moreover, in general, the program to be installed to the auxiliary storage unit 16 such as the HDD 15 of the motion image processing unit 3 is recorded to an optical information recording medium such as a CD-ROM (Compact Disk Read-Only Memory) or a DVD-ROM (Digital Versatile Disk Random Access Memory), a magnetic recording medium such as a FD (Floppy Disk), and the program recorded in a recording medium is installed into the auxiliary storage unit 16 of the HDD 15. The recording medium being portable such as the CD-ROM or the like as the optical information recording medium and such as the FD as the magnetic recording medium can be a storing medium for storing the motion image processing program. Furthermore, for example, the motion image processing program may be downloaded through the network interface 18, and may be installed into the auxiliary storage unit 16 such as the HDD 15.

In the motion image processing unit 3, when the motion image processing program running on the operating system is activated, CPU 11 executes various operating processes in accordance with the motion image processing program and intensively controls each process part. Processes having features of the present invention in the various operating processes executed by the CPU 11 of the motion image processing unit 3 will be described in the following.

Figure 11:
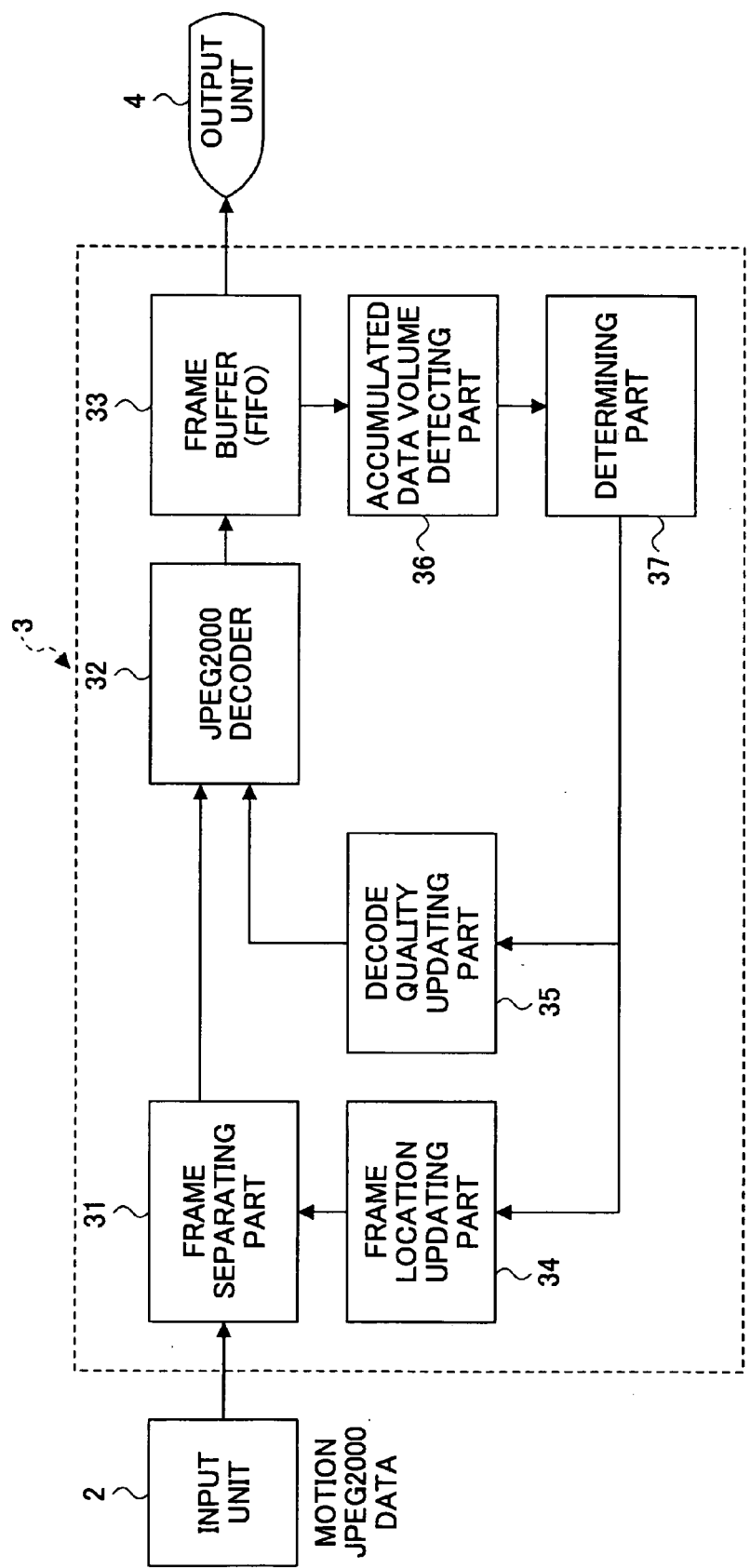
FIG. 11 is a functional block diagram showing functions realized by processes which a CPU executes based on a motion image processing program according to the first embodiment of the present invention.

Functions, which can be realized by the various operating processes executed by the CPU 11 of the motion image processing unit 3 will be described. As shown in FIG. 11, in the motion image processing unit 3, functions corresponding to a frame separating part 31, a JPEG 2000 decoder 32 functioning as a decoding part, a frame location updating part 34, a decode quality updating part 35, an accumulated data volume detecting part 36, and a determining part 37 are realized by the various operating processes executed by the CPU 11. In a case in that a real time operation is emphasized, it is needed to improve a process performance. In this case, it is preferable to provide a logic circuit (not shown) and realize various functions by operations of the logic circuit. In addition, the CPU 11 operates in accordance with the motion image program and forms a frame buffer 33 in the RAM 13.

The frame separating part 31 sequentially receives frame data forming Motion JPEG 2000 data being output from the input unit 2 based on an instruction of the frame location updating part 34.

The JPEG 2000 decoder 32 conducts a decoding process in accordance with a quality parameter indicated by the decode quality updating part 35 with respect to the frame data forming the Motion JPEG 2000 data. The quality parameter determines a decode quality of the decoding process. The quality parameter determines the decode quality by changing combined or each of decode parameters (layer of JPEG 2000, truncation value, level, and a like).

The frame buffer 33 maintains up to 24 sets of the frame data decoded by the JPEG 2000 decoder in an order of registration, and sequentially outputs the frame data from a set showing an older time.

The frame location updating part 34 instructs the frame separating part 31 to skip frames until a next frame of which a frame location is indicated to process next.

The decode quality updating part 35 instructs the JPEG 2000 decoder 32 to update the quality parameter for the decoding process.

The accumulated data volume detecting part 36 detects the number of sets of frame data maintained in the frame buffer 33 and obtains a frame data number (D) showing an extra number of sets of frame data that can be additionally maintained in the frame buffer 33.

The determining part 37 updates the quality parameter based on the frame data number (D) showing the extra number of sets of frame data that can be additionally maintained in the frame buffer 33, indicates a frame location to the frame location updating part 34 ¥, and sends the quality parameter being updated to the decode quality updating part 35. That is, the determining part 37 functions as a quality parameter calculating part and a frame location determining part. In the first embodiment, the determining part 37 instructs the frame location updating part 34 so as to set the quality parameter to be a highest quality when the frame data number (D) is equal to or greater than 21 sets of frame data, to set the quality parameter to be from a lower quality to a higher quality corresponding to the frame data number (D) when the frame data number (D) is from 5 to 20 sets of the frame data, and to drop frames corresponding to an available capacity of the frame buffer 33 when the frame data number (D) is equal to or less than 4.

Figure 12:
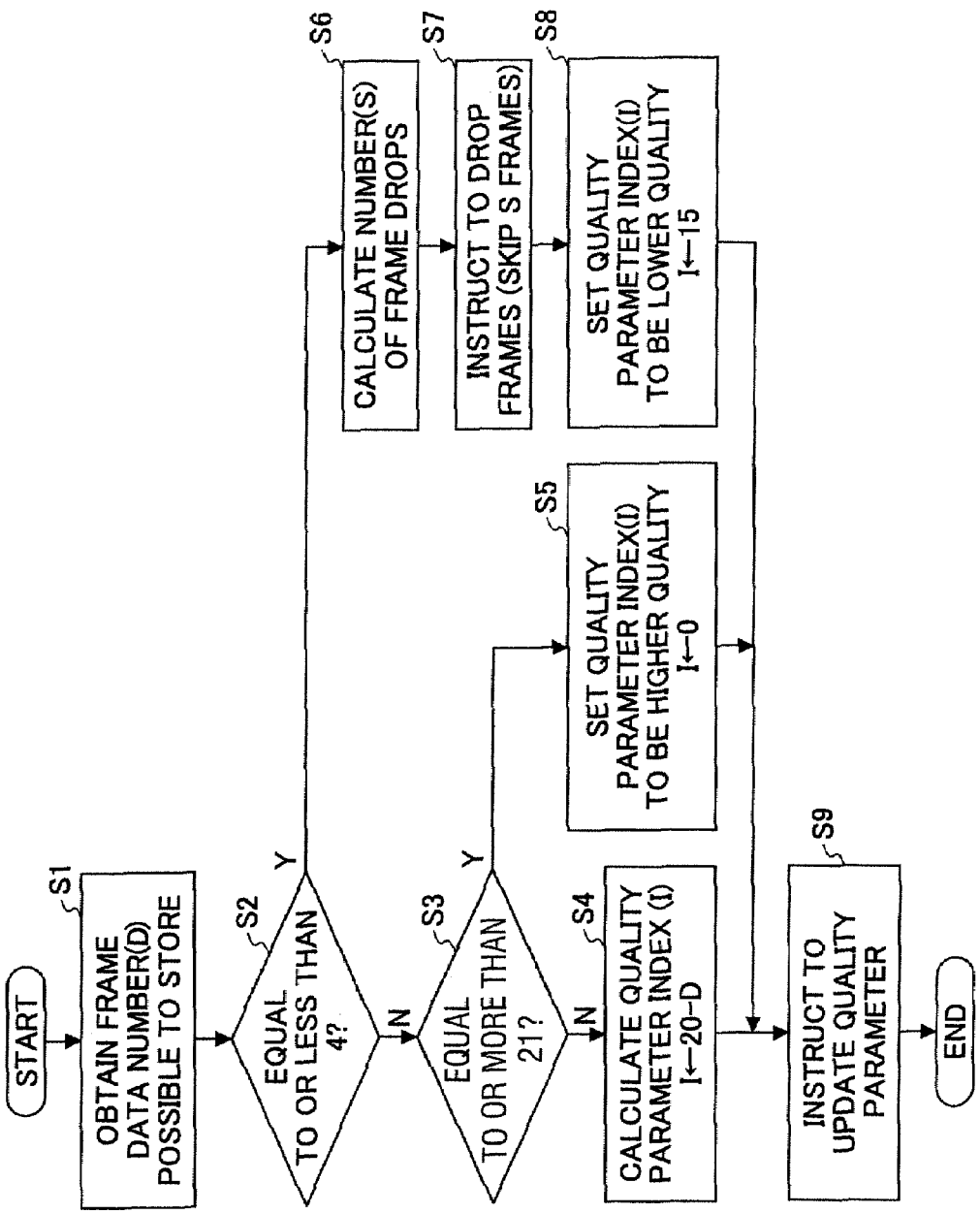
FIG. 12 is a flowchart showing a flow of a process control by a determining part according to the first embodiment of the present invention.

FIG. 12 is a flowchart for explaining a flow of a process control of the determining part, according to the first embodiment of the present invention. As shown in FIG. 12, first, when the determining part 37 obtains the frame data number (D) showing the extra number of sets of frame data that can be additionally maintained in the frame buffer 33 (step S1), the determining part 37 determines whether or not the frame data number (D) is equal to or less than 4 sets of frame data possible to further store in the frame buffer 33. When the determining part 37 determines that the frame data number (D) is not equal to or less than 4 sets of frame data (N of step S2), the determining part 37 further determines whether or not the frame data number (D) is equal to or more than 21 sets of frame data possible to further store in the frame buffer 33 (step S3).

That is, when the determining part 37 determines that the frame data number (D) is from 5 to 20 sets of frame data possible to further store in the frame buffer 33 (N of step S3), the determining part 37 determines the quality parameter as a quality parameter index (I) based on the frame data number (D) possible to further store in the frame buffer 33 (step S4). That is, the quality parameter index (I) determined by the determining part 37 is expressed as follows:

quality parameter index $(I) \leftarrow 20-D$.

Moreover, when the determining part 37 determines that the frame data number (D) is equal to or greater than 21 sets of frame data possible to further storing in the frame buffer 33 (Y of step S3), the determining part 37 determines the quality parameter as the quality parameter index (I) showing the highest quality (step S5). That is, the quality parameter index (I) determined by the determining part 37 is expressed as follows:

quality parameter index $(I) \leftarrow 0$.

Furthermore, when the determining part 37 determines that the frame data number (D) is equal to or less than 4 sets of frame data possible to further store in the frame buffer 33 (Y of step S2), the determining part 37 calculates the number (S) of frames to drop (step S6). The number (S) of frames to drop is expressed as follows:

the number (S) of frames to drop $\leftarrow 4-D+1$.

Therefore, it is possible to further drop the frame rate only when the frame data number (D) possible to further store in the frame buffer 33 is significantly smaller.

After that, the determining part 37 instructs the frame location updating part 34 to advances for the number (S) of frames calculated to determine a next frame location (step S7), and determines the quality parameter as the quality parameter index (I) showing the lowest quality (step S8). That is the quality parameter index (I) is expressed as follows:

the quality parameter index $(I) \leftarrow =15$.

Therefore, it is possible to determine the quality parameter based on the frame data number (D) possible to further store in the frame buffer 33 obtained by the accumulated data volume detecting part 36 by a simple process.

In step S9, the determining part 37 sends the quality parameter determined in step S4, S5, or S8 to the decode quality updating part 35, and instructs the decode quality updating part 35 to update the quality parameter.

Figure 13:
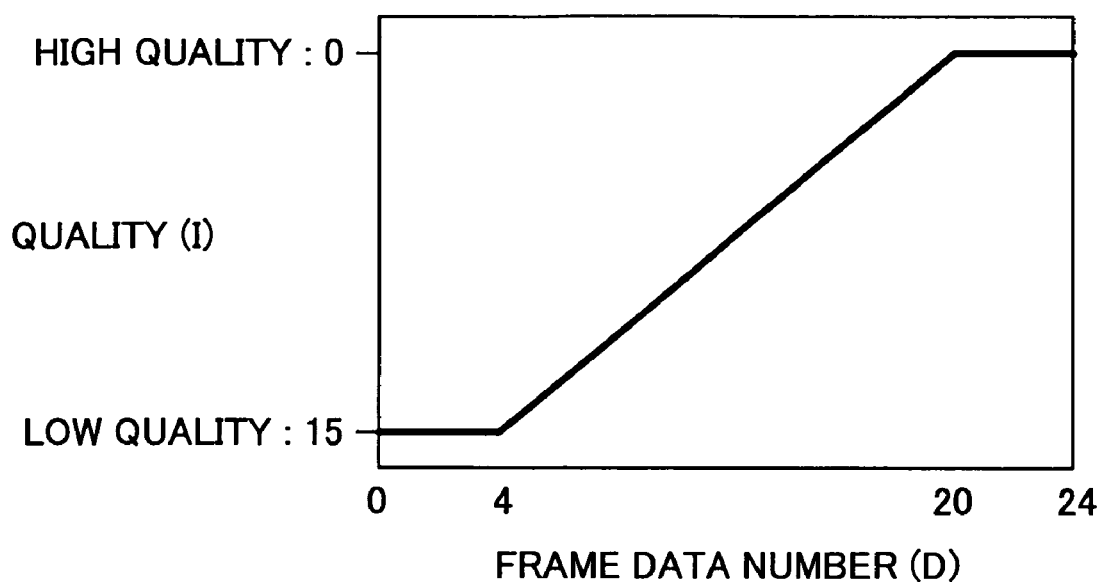
FIG. 13 is a graph showing a relationship between a quality parameter index (I) and a frame data number (D) possible to further store in a frame buffer, according to the first embodiment of the present invention.

A relationship between the quality parameter index (I) as described above and the frame data number (D) possible to further store in the frame buffer 33 is shown in FIG. 13.

Next, a flow of a series of processes by the various functions described above will be described. Each frame in the Motion JPEG 2000 data output from the input unit 2 is separated as a single set of the frame data based on an instruction from the frame location updating part 34 by the frame separating part 31. The JPEG 2000 decoder 32 conducts the decoding process for the single set of the frame data separated by the frame separating part 31 in accordance with the quality parameter indicated by the decode quality updating part 35, and then the single set of the frame data is registered to the frame buffer 33. The motion image data registered in the frame buffer 33 are successively output to the output unit 4 (display unit 19) from older data on time, so as to display a video picture at the output unit 4 (display unit 19).

On the other hand, when the frame data number (D) possible to further store in the frame buffer 33 is obtained corresponding to the number of sets of the frame data maintained in the frame buffer 33 by the accumulated data volume detecting part 36, the quality parameter is calculated based on the frame data number (D) possible to further store in the frame buffer 33 by the determining part 37, a new quality parameter is given to the JPEG 2000 decoder 32 by the decode quality updating part 35, and the quality parameter is updated for a later decoding process. That is, the quality parameter is set to indicate a lower quality when the frame data number (D) possible to further store in the frame buffer 33 is smaller, and the quality parameter is set to indicate a higher quality when the frame data number (D) possible to further store in the frame buffer 33. Moreover, when the frame data number (D) possible to further store in the frame buffer 33 is significantly smaller, the frame location updating part 34 instructs the frame separating part 31 to drop frames.

In the first embodiment, the JPEG 2000 decoder 32 as the decoder part conducts the decoding process with respect to the single set of the frame data separated by the frame separating part 31, based on the quality parameter. The quality parameter is calculated based on the frame data number (D) possible to further store in the frame buffer 33 by the determining part 37 functioning as a quality parameter calculating part, and is updated for the decoding part by the decode quality updating part 35. Moreover, the next frame location to process next is determined based on the frame data number (D) possible to further store in the frame buffer 33 obtained from the accumulated data volume detecting part 36, by the determining part 37 functioning as a frame location determining part, and the next frame location to process next is indicated to the frame separating part 31 by the frame location updating part 34. Accordingly, it is possible to adaptively control the image quality corresponding to a performance ability of the decoding process, and in principle, it is possible to realize a real time decoding process by adjusting the image quality while maintaining the frame rate, without an occurrence of the frame drop due to a time delay of reproduction. Furthermore, it is possible to maintain the image quality and the frame rate as much as possible. That is, it is possible to realize a smooth motion image reproduction without the occurrence of the frame drop due to the time delay of the reproduction.

In the first embodiment, the personal computer is applied as the motion image processing unit 3. However, the present invention is not limited to this configuration. Alternatively, for example, a portable information terminal (PDA (Personal Digital Assistant)), a mobile telephone, or the like can be applied to the motion image processing unit 3.

Second Embodiment

In the following, a second embodiment will be described according to the present invention. In the second embodiment, an entire configuration of a motion image outputting system is the same as the entire configuration of the motion image outputting system in the first embodiment shown in FIG. 9, and an explanation thereof will be omitted. And a module configuration of a motion image processing unit in the second embodiment is the same as the module configuration of the motion image processing unit in the first embodiment shown in FIG. 10, and an explanation thereof will be omitted.

Figure 14:
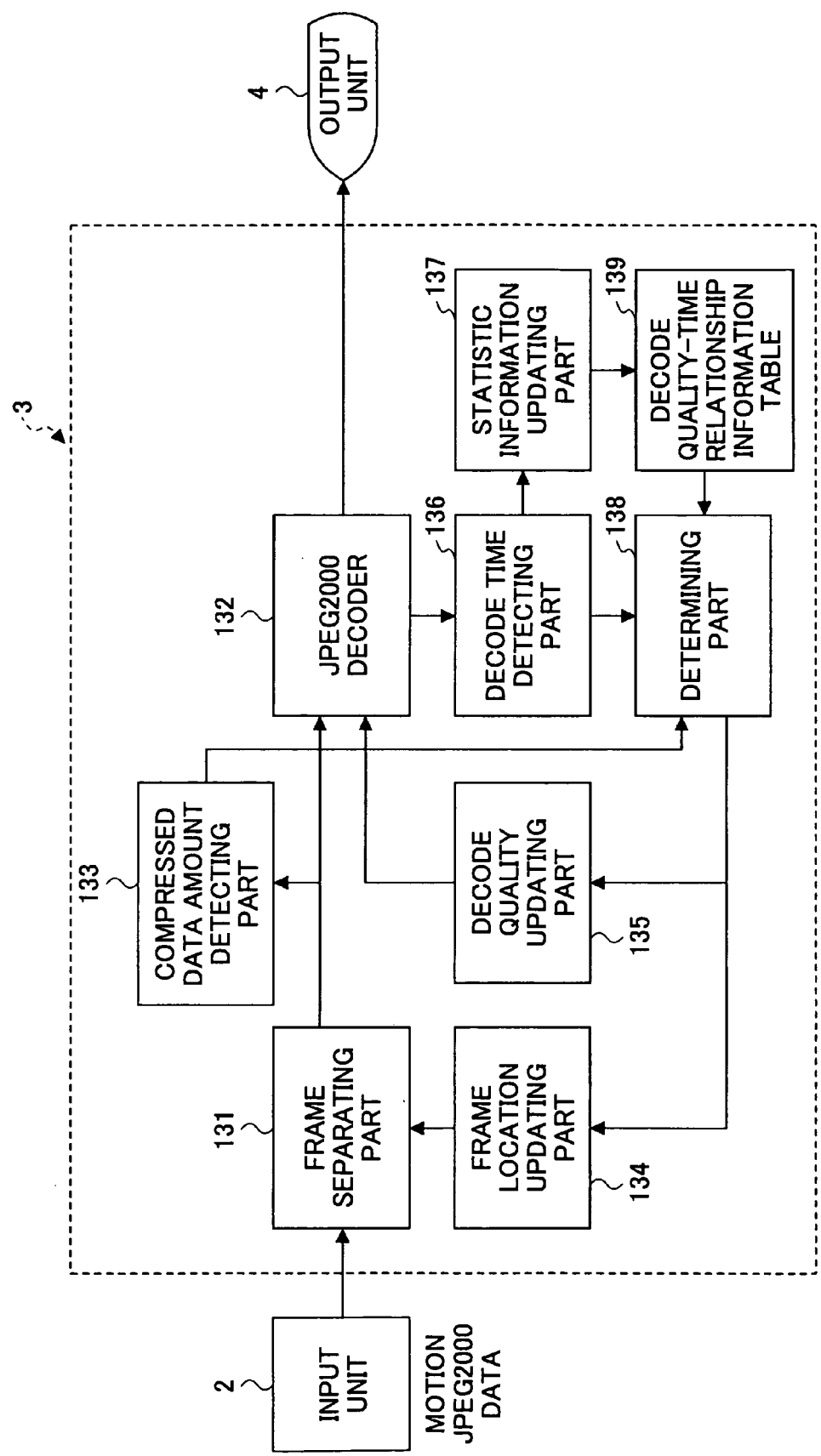
FIG. 14 is a functional block diagram showing functions realized by processes which a CPU executes based on a motion image processing program according to a second embodiment of the present invention.

In the following, functions realized by various operating processes executed by the CPU 11 of the motion image processing unit 3 will be described according to the second embodiment of the present invention. As shown in FIG. 14, in the motion image processing unit 3, functions corresponding to a frame separating part 131, a JPEG 2000 decoder 132 functioning as a decoding part, a compressed data amount detecting part 133, a frame location updating part 134, a decode quality updating part 135, a decode time detecting part 136, a statistic information updating part 137, and a determining part 138 are realized by various operating processes executed by the CPU 11. In a case in that a real time performance is emphasized, it is needed to improve a process performance. In this case, it is preferable to provide a logic circuit (not shown) and realize various functions by operations of the logic circuit. In addition, the CPU 11 operates in accordance with the motion image program and forms a decode quality-time relationship information table 139 in the RAM 13.

The frame separating part 131 sequentially receives frame data forming Motion JPEG 2000 data being output from the input unit 2 based on an instruction of the frame location updating part 134.

The JPEG 2000 decoder 132 conducts a decoding process in accordance with a quality parameter indicated by the decode quality updating part 135 with respect to the frame data forming the Motion JPEG 2000 data. The quality parameter determines a decode quality of the decoding process. The quality parameter determines the decode quality by changing combined or each of decode parameters (layer of JPEG 2000, truncation value, level, and a like).

The compressed data amount detecting part 133 obtains the size of the frame data for one frame received by the frame separating part 131.

The frame location updating part 134 instructs the frame separating part 131 to skip frames until a next frame of which a frame location is indicated to process next.

The decode quality updating part 135 instructs the JPEG 2000 decoder 132 to update the quality parameter for the decoding process.

The decode time detecting part 136 obtains a process time which the JPEG 2000 decoder 132 consumes to decode the frame data for one frame.

Figure 15:
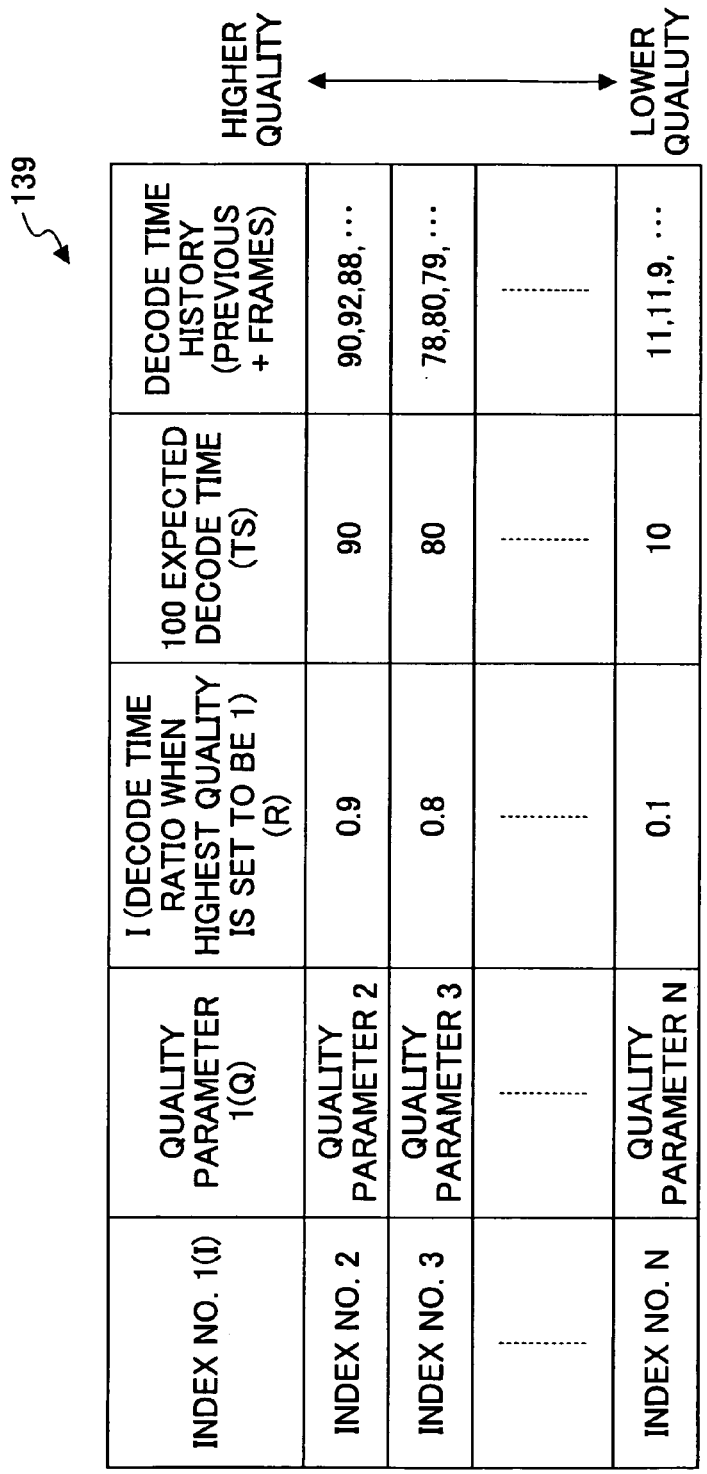
FIG. 15 is a diagram illustrating a decode quality-time relationship information table according to the second embodiment of the present invention.

As shown in FIG. 15, the decode quality-time relationship information table 139 is a table showing levels (N) possible to change the quality parameter, which is used to change the decode quality of Motion JPEG 2000 data, from a high quality to a low quality, and has entries just for combinations of the quality parameters to instruct the JPEG 2000 decoder 132. Information in the entries can be specified and indicated by an index. As shown in FIG. 15, the decode quality-time relationship information table 139 includes an expected ratio (R) of a decode time (time required for the decoding process) in that the highest quality is defined as "1", in the entries in the table 139. The expected ratio (R) is calculated based on an actual value beforehand. Moreover, the entries of the decode quality-time relationship information table 139 include a decode time history (TH) while running, and an expected decode time (TS) as a representative value. The expected decode time (TS) is initialized based on a value of the decode time ratio (R) when the highest quality is defined as "1", and sequentially updated while the decoding process (extending process) is being updated. As described above, by defining the decoding process time, which is expected for each quality, as the expected decode time, it is possible to easily determine the expected time for the decoding process corresponding to the quality parameter. In addition, the decode time history (TH) is an area of a list form, and stores an actual measured value of passed dozens of frames. Therefore, it is possible to determine the expected time of the decoding process corresponding to the quality parameter based on passed actual measured value of the decoding process time. That is, the expected decode time (TS) can be updated by considering this information.

Figure 16:
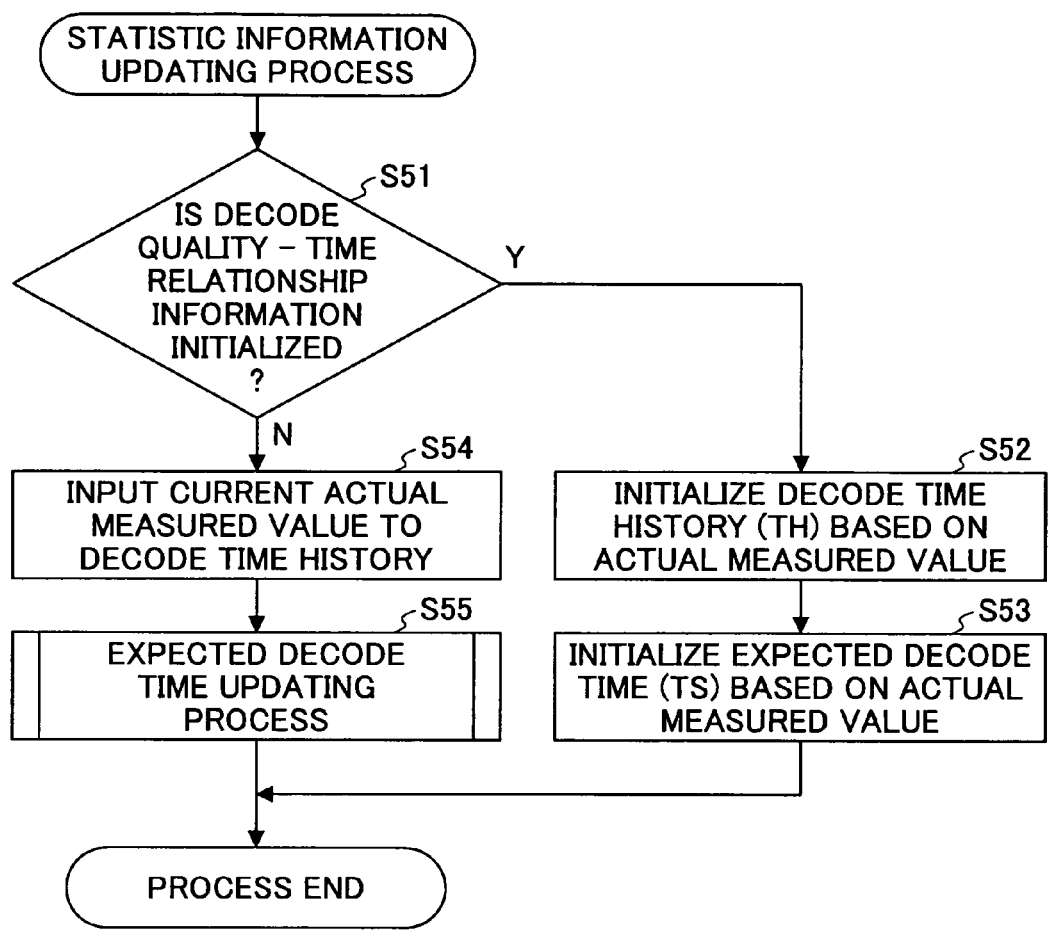
FIG. 16 is a flowchart showing a flow of a statistic information updating process conducted by a statistic information updating part according to the second embodiment of the present invention.

The statistic information updating part 137 records an actual decode time when the decoding process (extending process) is conducted, and updates the expected decode time (TS) of the decode quality-time relationship information table 139 that will be used later. In detail, as shown in FIG. 16, for example, in a case of maintaining information for one second for motion image s of 30 frames/sec, when the information is initially processed (Y of step S51), the expected decode time (TS) of the decode quality-time relationship information table 139 and 30 entries of the decode time history (TH) are initialized (steps S52 and S53, initializing part). These initialization processes for the expected decode time (TS) of the decode quality-time relationship information table 139 and 30 entries of the decode time history (TH) in steps S52 and S53 are conducted based the decoding process (extending process) time required to decode (extend) a standard image that is prepared beforehand.

In the following processes (N of step S51), the actual measured time of the process time of a current decoding process (extending process) is registered to the decode time history (TH) (step S54), and an expected decode time updating process is conducted to update the expected decode time (TS) of the decode quality-time relationship information table 139 based on the previous statistic information (step S55, expected decode time updating part).

Figure 17:
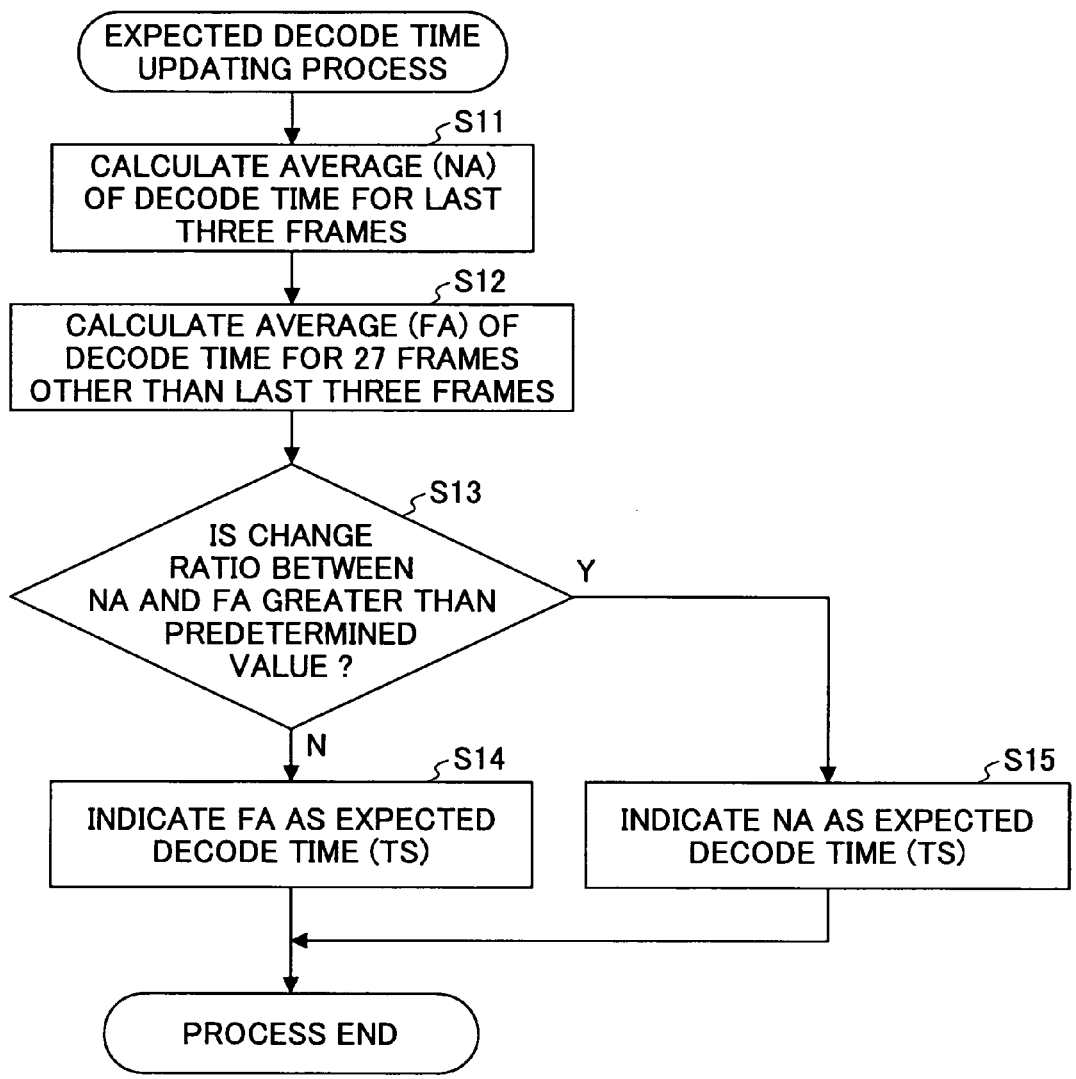
FIG. 17 is a flowchart showing a flow of an expected decode time updating process according to the second embodiment of the present invention.

In detail, as described in FIG. 17, the expected decode time updating process calculates an average (NA) of the decode (extension) time of last three frames from the decode time history (TH) of an index corresponding to the decode quality-time relationship information table 139 (step S11), and calculates an average (FA) of the decode (extension) time of 27 frames other than the last three frames from the decode time history (TH) of the index corresponding to the decode quality-time relationship information table 139 (step S12).

Next, the average (NA) of the decode (extension) time of the last three frames and the average (FA) of the decode (extension) time of the 27 frames other than the last three frames are compared each other (step S13). When a change ratio between the average (NA) and the average (FA) is not greater than a predetermined value (for example, 10%) (N of step S13), the average (FA) of the decode (extension) time of 27 frames is indicated as the expected decode time (TS) (step S14), so that the average (FA) is set as a new expected decode time (TS). On the other hand, the ratio between the average (NA) and the average (FA) are greater than the predetermined value (Y of step S13), the average (NA) of the decode (extension) time of the last three frames is indicated as the expected decode time (TS) (step S15), so that the average (NA) is set as a new expected decode time (TS).

Figure 18:
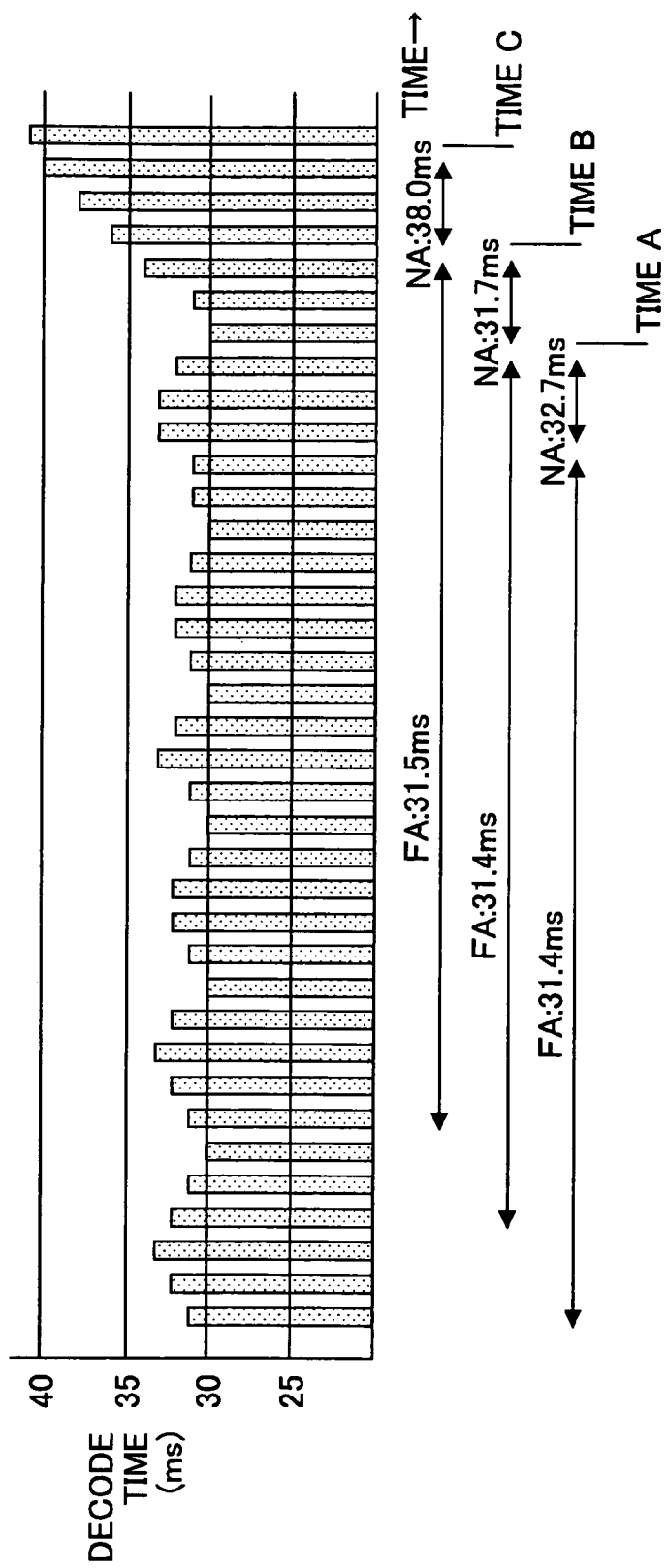
FIG. 18 is a diagram illustrating a comparison between an average (NA) of a decode (extension) time of last three frames and an average (FA) of the decode (extension) time of 27 frames other than the last three frames, according to the second embodiment of the present invention.
Figure 19:
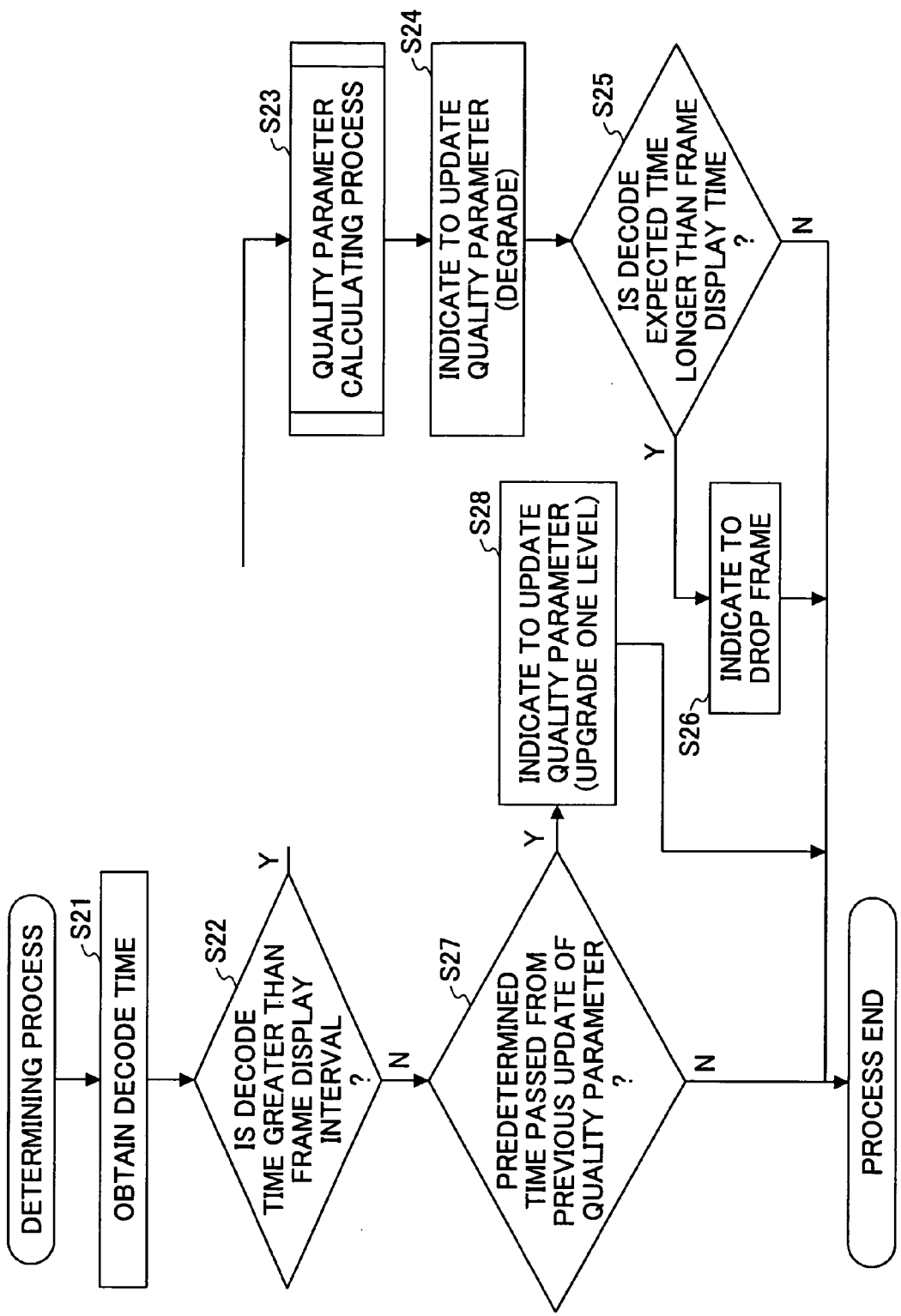
FIG. 19 is a flowchart showing a flow of a determining process conducted by a determining part according to the second embodiment of the present invention.

FIG. 18 is a diagram illustrating a comparison between the average (NA) of the decode (extension) time of the last three frames and the average (FA) of the decode (extension) time of the 27 frames other than the last three frames. As shown in FIG. 18, since the change ratio between the average (FA) and the average (NA) at a time A is approximately 4%, 31.4ms of the average (FA) of the decode (extension) time of the 27 frames is determined as the expected decode time (TS). Since the change ratio between the average (FA) and the average (NA) at a time B is approximately 1%, 31.4ms of the average (FA) of the decode (extension) time of the 27 frames is determined as the expected decode time (TS). Since the change ratio between the average (FA) and the average (NA) at a time B is approximately 20%, 38.0ms of the average (NA) of the decode (extension) time of the last three frames is determined as the expected decode time (TS). That is, if the average (NA) of the decode (extension) time of only a last one sample or the last three frames is evaluated, value is frequently changed as follows:

32.7ms->31.7ms->38.0ms.

However, the above-mentioned process can suppress the change ratio to be smaller for a small change and corresponds to a larger change.

As described above, the expected decode time (TS) of the decode quality-time relationship information table 139 is updated.

The determining part 138 calculates the quality parameter based on the decode process time obtained from the decode time detecting part 136 and the size of data of frame being compressed, which is obtained from the compressed data volume detecting part 133, and outputs a calculated quality parameter to the decode quality updating part 135. That is, the determining part 138 functions as the quality parameter calculating part and the frame location determining part. In detail, as shown in FIG. 18, the JPEG 2000 decoder 132 obtains a process time required to decode (extend) data of one frame from the decode time detecting part 136 (step S21) and compares a time resulted from deducting a previous exceeded time for a frame display from a display time of the one frame (in generally, 1/frame rate second) with the decode process time obtained in step S21 (step S22). For example, in a case of the motion image of 30 frames/sec, it is determined whether or not the decode process time is greater than a frame display interval time 33ms.

When the decode process time obtained in step S21 is greater than the time resulted from deducting the previous exceeded time for the frame display from the display time of the one frame (Y of step S22), a quality parameter calculating process for calculating a new quality parameter is executed (step S23).

Figure 20:
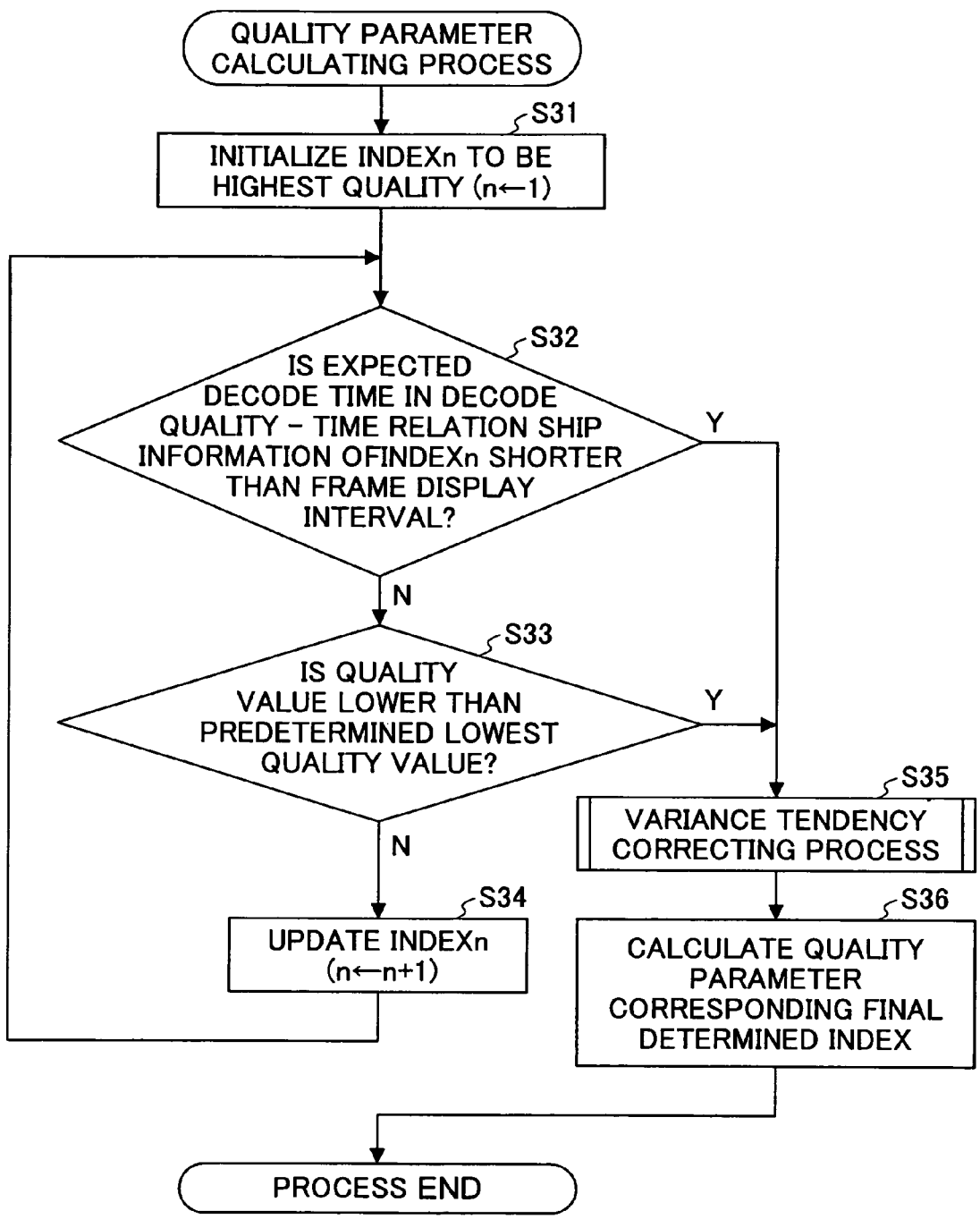
FIG. 20 is a flowchart showing a flow of a quality parameter calculating part according to the second embodiment of the present invention.

FIG. 20 is a flowchart for explaining the quality parameter calculating process. As shown in FIG. 20, an index, is initialized to be an index (n<−1) of the highest quality in order to refer to the decode quality-time relationship information table 139 (step S31).

In step S32, it is determined whether or not the expected decode time (TS) in the decode quality-time relationship information table 139 of the index$_n$ is shorter than the frame display interval time.

When the expected decode time (TS) in the decode quality-time relationship information table 139 of the index, is not shorter than the frame display interval time (N of step S32), the quality parameter calculating process advances to step S33.

In step S33, it is determined whether or not a quality value is lower than a predetermined lowest quality value.

When the quality value is not lower than the predetermined lowest quality value (N of step S33), the index$_n$ showing a current quality value is incremented by 1 (step S34), the quality parameter calculating process goes back to step S32. Then, a variance tendency correcting process (variance tendency correcting part) is executed.

On the other hand, when the expected decode time (TS) in the decode quality-time relationship information table 139 of the index$_n$ is shorter than the frame display interval time (Y of step S32), or when the quality value is lower than the predetermined highest quality value (Y of step S33), the quality parameter calculating process advances to step S35. Then, the variance tendency correcting process (variance tendency correcting part) is executed.

Figure 21:
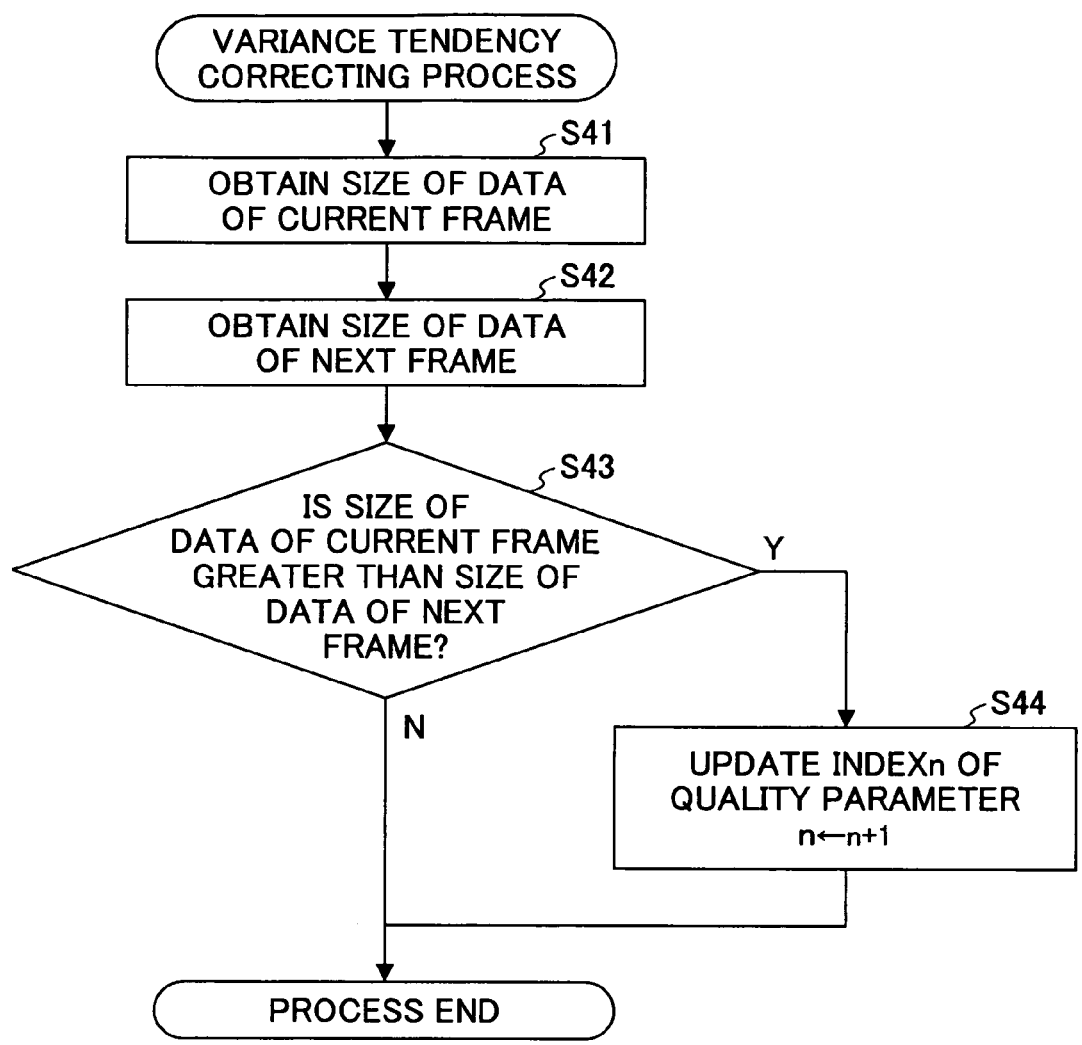
FIG. 21 is a flowchart showing a flow of a variance tendency correcting process according to the second embodiment of the present invention.

FIG. 21 is a flowchart for explaining the variance tendency correcting process. As shown in FIG. 21, the size of data being compressed of a current frame is obtained from the compressed data volume detecting part 133 (step S41), and the size of data being compressed of a next frame to decode (extend) is obtained from the compressed data volume detecting part 133 (step S42). Then, both sizes are compared (step S43).

When it is determined that the size of data being compressed of the next frame to decode (extend) is greater than the size of data being compressed of the current frame (Y of step S43), the variance tendency correcting process advances to step S44. Then, the index$_n$ of the quality parameter is incremented by 1 and the variance tendency correcting process is terminated. That is, when it is determined that the size of data being compressed of the next frame is greater than the size of data being compressed of the current frame (Y of step S43), the quality is degraded.

By conducting the variance tendency correcting process, it is possible to correct the quality parameter of the next frame to process in response to an increase/decrease tendency of the size of data being compressed of the frame to decode (extend).

Accordingly, the frame rate can be surely maintained by correcting the quality parameter by corresponding to an increase/decrease of the size of the data of the nearest frame to process.

When the variance tendency correcting process (step S35) is terminated, the quality parameter corresponding to the final determined index,.

Then, the quality parameter calculating process (step S23) is terminated. Accordingly, it is possible to obtain the highest quality value of the quality parameter possible to process within the frame display time from statistic information of the process time required to conduct the decoding (extending) process for the frame and the variance tendency of a frame compression amount.

When the quality parameter calculating process (step S23) is terminated, the determining process advances to step S24, and the quality parameter is updated by a new quality parameter calculated in the quality parameter calculating process (step S23). In this case, the quality parameter updated in step S23 degrades the quality.

Subsequently, the determining process advances to step S25, and then, compares an expected value of the decoding process time in the newly updated quality parameter with the display time of the one frame.

When it is determined that the decode expected time is greater than the frame display time (Y of step S25), the determining process advances to step S26, and instructs to drop frames. For example, in a case of the motion image of 30 frames/sec, when the decode expected time is greater than the frame display interval time 33ms, the determining part instructs to drop frames. By dropping frames, the next frame location is updated by a time including the expected value of the decoding process time by the newly updated quality parameter.

In addition, it is determined that the decode expected time is not greater than the frame display time (N of step S25), the determining process is terminated.

On the other hand, when it is determined that the decoding process time obtained in step S21 is not greater than the time resulted from deducting the previous exceeded time of the frame display from the display time of the one frame (N of step S22), it is determined whether or not a predetermined time passes from the previous quality parameter (step S27). The predetermined time is preferably approximately 1 second.

When it is determined that the predetermined time passes since the previous quality parameter is updated (Y of step S27), the determining process advances to step S28, and instructs to update the quality parameter by upgrading one stage from a previous state. In this case, the quality parameter to update upgrades the quality. A reason to upgrade the quality parameter by one stage every time is to prevent the image quality from being significantly changed. For example, in a case of the motion image of 30 frames/sec, when the decoding process time is continuously shorter than the frame display interval time 33ms, the quality parameter is upgraded by one stage every one second.

In addition, when it is determined that the predetermined time does not pass since the previous quality parameter is updated (N of step S27), the determining process is terminated.

By the determining process conducted by the determining part 138, it is possible to control an instruction to update the quality parameter and drop frames for the later decoding process (extending process) based on the process time required to the actual decoding process (extending process).

Next, a flow of a series of processes by various functions described above will be described. The Motion JPEG 200 data output from the input unit 2 is separated every frame based on an instruction from the frame location updating part 134 by the frame separating part 131. The decoding process (extending process) is conducted for data of the frame separated by the frame separating part 131, in accordance with the quality parameter indicated by the decode quality updating part 135. After the JPEG 2000 decoder 132 conducts the decoding process (extending process) for the motion image, the motion image data are sequentially output to the output unit 4 (display unit 19), and the video picture is displayed at the output unit 4 (display unit 19).

On the other hand, when the decoding process (extending process) time of the data of the frame is obtained by the decode time detecting part 136, the quality parameter is calculated based on the decoding process (extending process) time of the data of the frame by the determining part 138. The new quality parameter is given to the JPEG 2000 decoder 132 to the decode quality updating part 135, and the quality parameter is updated for the later decoding process. For example, in a case of the motion image of 30 frames/sec, when it is determined that the decoding process time is greater than the frame display interval time 33ms and the next frame cannot be displayed on time, the decode quality-time relationship information table 139 is referred, and the quality parameter is degraded to be a quality parameter, of which the expected decode time expected to be sufficient until the following frame display interval time is shorter than 33 ms. In addition, in a case in that the quality parameter being calculated is lower than a predetermined quality level, the quality parameter is fixed to be a predetermined value. In this case, when it is determined that the next frame cannot be displayed within the frame display interval time 33ms, the frame location updating part 134 instructs the frame separating part 131 to drop frames.

The statistic information updating part 137 updates the decode quality-time relationship information table 139 based on the decoding process (extending process) time of the data of the frame obtained by the decode time detecting part 136.

According to the second embodiment, the JPEG 2000 decoder 132 as the decoding part decodes the data of the frame (frame data) separated by the frame separating part 131 based on the quality parameter. The quality parameter is calculated based the decoding process time required to the data of one frame obtained by the decode time detecting part 136 by the determining part 138 functioning as the quality parameter calculating part, is update by the decode quality updating part 135 for the JPEG 2000 decoder 132. Moreover, the next frame location to process is determined based on the expected time of the decoding process corresponding to the quality parameter and the actual decoding process time of the one frame by the determining part 138 functioning as the frame location determining part. Accordingly, the next frame location to process is indicated to the frame separating part 131 by the frame location updating part 134. Thus, it is possible to control the image quality adaptive to a performance ability of the decoding process (extension process). In principle, it is possible to the real time decoding process without an occurrence of the frame drop due to the time delay caused by the reproduction, by adjusting the quality while maintaining the frame rate. Furthermore, even if the frame rate should be degraded, it is possible to manage maintaining the image quality and the frame rate as much as possible. That is, it is possible to conduct a smooth motion image reproduction without the occurrence of the frame drop due to the time delay caused by the reproduction as mush as possible.

In the second embodiment, the personal computer is applied as the motion image processing unit 3. However, the present invention is not limited to this configuration. Alternatively, for example, a portable information terminal (PDA (Personal Digital Assistant)), a mobile telephone, or the like can be applied to the motion image processing unit 3.

According to the present invention, while the decoding part conducts the decoding process for the frame data separated by the frame separating part based on the quality parameter, the quality parameter calculating part calculate the quality parameter based the decode process time of the frame data for one frame obtained by the decode time detecting part, and the decode quality updating part updates the quality parameter for the decoding part. Moreover, the frame location determining part determines the next frame location to process based on the expected time of the decoding process corresponding to the quality parameter calculated by the quality parameter calculating part and the actual decoding process time of the frame. Then, the frame location updating part indicates the next frame location to the frame separating part. Therefore, it is possible to adaptively control the image quality corresponding to the performance ability of the decoding process. In principle, it is possible to realize a real time decoding process by adjusting the image quality while maintaining the frame rate, without an occurrence of the frame drop due to a time delay of reproduction. Furthermore, it is possible to maintain the image quality and the frame rate as much as possible. That is, it is possible to realize a smooth motion image reproduction without the occurrence of the frame drop due to the time delay of the reproduction.

According to the present invention, it is possible to easily calculate the quality parameter.

According to the present invention, it is possible to improve an accuracy of a real time process.

According to the present invention, since the expected decoding process time for each quality is determined as the expected decode time, it is possible to easily determine the expected time of the decoding process corresponding to the quality parameter.

According to the present invention, it is possible to determine the expected time of the decoding process corresponding to the quality parameter based on the passed actual measured value of the decoding process time.

According to the present invention, it is possible to initialize the expected decode time as the expected decode process time based on the decoding process time required to conduct the decoding process for the compressed data of the standard image.

According to the present invention, it is possible to suppress the change ratio to be smaller for a small change and corresponds to a larger change.

According to the present invention, since the quality parameter is corrected by corresponding to an increase or an decrease of the size of the frame data of the nearest frames based on the size of the frame data of a next frame to process.

According to the present invention, it is possible to obtain a higher compression rage and a motion image having a higher image quality.

The present invention is not limited to the specifically disclosed embodiments, and variations and modifications may be made without departing from the scope of the present invention.

The present application is based on the Japanese Priority Patent Applications No. 2003-129807 filed on May 8, 2003 and No. 2003-129808 filed on May 8, 2003, the entire contents of which are hereby incorporated by reference.

What is claimed is:

1. A motion image processing apparatus for reproducing motion image data being compressed by a digital motion image compressing method for conducting an image compressing process by information in a frame, said motion image processing apparatus comprising:

a frame separating part sequentially separating and outputting frame data forming said motion image data every one frame;

a decoding part conducting a decoding process for the frame data output by said frame separating part;

a frame buffer maintaining the frame data decoded by said decoding part and sequentially outputting from older frame data in a chronological order;

an accumulated data volume detecting part detecting a first number of sets of the frame data maintained in the frame buffer, and obtaining a frame data number D of sets of the frame data possible to further store in the frame buffer;

a quality parameter calculating part calculating a quality parameter used to determine a decode quality at the decoding process conducted by said decoding part, based on the frame data number D; and a decode quality updating part indicating said decoding part to update the quality parameter calculated by said quality parameter calculating part, wherein said quality parameter calculating part includes a first part determining the quality parameter as a predetermined quality value minus the frame data number D, when the frame data number D is smaller than the first threshold and greater than the second threshold (second threshold<D<first threshold).

2. The motion image processing apparatus as claimed in claim 1, wherein said quality parameter calculating part includes:

a second part determining the quality parameter as a highest quality when the frame data number D showing an extra number of sets of the frame data that can be additionally maintained in the frame buffer is greater than a first threshold (D>first threshold), said frame data number obtained from said accumulated data volume detecting part; and a third part determining the quality parameter as a lowest quality when the frame data number is smaller than a second threshold (D<second threshold), said frame data number obtained from said accumulated data volume detecting part.

3. A motion image processing apparatus for reproducing motion image data being compressed by a digital motion image compressing method for conducting an image compressing process by information in a frame, said motion image processing apparatus comprising:

a frame separating part sequentially separating and outputting frame data forming said motion image data every one frame;

a decoding part conducting a decoding process for the frame data output by said frame separating part;

a frame buffer maintaining the frame data decoded by said decoding part and sequentially outputting from older frame data in a chronological order;

an accumulated data volume detecting part detecting a first number of sets of the frame data maintained in the frame buffer, and obtaining a frame data number D of sets of the frame data possible to further store in the frame buffer;

a frame location determining part determining a next frame location to process, based on the frame data number D; and a frame location updating part indicating the frame location determined by said frame location determining part, to said frame separating part, wherein said frame location determining part calculates a number of frames to drop as a predetermined number minus the frame data number D when the frame data number D is smaller than a second threshold (D<second threshold), and determines a next frame location by advancing by the number of frames.

4. The motion image processing apparatus as claimed in claim 1 or 3, wherein said digital motion image compressing method is a Motion JPEG 2000 method.

5. A motion image processing program product being computer readable for causing a computer to reproduce motion image data being compressed by a digital motion image compressing method for conducting an image compressing process by information in a frame, said motion image processing program product comprising a computer-recorded medium encoded with a computer program that comprises the codes for:
(a) sequentially separating and outputting frame data forming said motion image data every one frame;
(b) conducting a decoding process for the frame data output by said code (a);
(c) detecting a first number of sets of the frame data maintained in a frame buffer used to maintain the frame data decoded by said code (b) and sequentially outputting from older frame data in a chronological order, and obtaining a frame data number D of sets of the frame data possible to further store in the frame buffer;
(d) calculating a quality parameter used to determine a decode quality at the decoding process conducted by said code (b), based on the frame data number D; and
(e) indicating said code (b) to update the quality parameter calculated by said code (d),
wherein said code (d) includes the codes for determining the quality parameter as a predetermined quality value minus the frame data number D when the frame data number D is smaller than the first threshold and greater than the second threshold (second threshold<D<first threshold).

6. The motion image processing program product as claimed in claim 5, wherein said code (d) includes the codes for:
determining the quality parameter as the highest quality when a frame data number D showing an extra number of sets of the frame data that can be additionally maintained in the frame buffer is greater than a first threshold (D>first threshold), said frame data number obtained by said code (c); and
determining the quality parameter as a lowest quality when the frame data number is smaller than a second threshold (D<second threshold), said frame data number obtained said frame data number obtained by said code (c).

7. A motion image processing program product being computer readable for causing a computer to reproduce motion image data being compressed by a digital motion image compressing method for conducting an image compressing process by information in a frame, said motion image processing program product comprising a computer-recorded medium encoded with a computer program that comprises the codes for:
(a) sequentially separating and outputting frame data forming said motion image data every one frame;
(b) conducting a decoding process for the frame data output by said code (a);
(c) detecting a first number of sets of the frame data maintained in a frame buffer used to maintain the frame data decoded by said code (b) and sequentially outputting from older frame data in a chronological order, and obtaining a frame data number D of sets of the frame data possible to further store in the frame buffer;
(d) determining a next frame location to process, based on the frame data number D; and
(e) indicating the frame location determined by said code (d), to said code (a),
wherein said code (e) includes calculating a number of frames to drop as a predetermined number minus the frame data number D when the frame data number D is smaller than a second threshold (D<second threshold), and determining a next frame location by advancing by the number of frames.

8. The motion image processing program product as claimed in claim 5 or 7, wherein said digital motion image compressing method is a Motion JPEG 2000 method.

9. A computer-readable recording medium recorded with a motion image processing program product for causing a computer to reproduce motion image data being compressed by a digital motion image compressing method for conducting an image compressing process by information in a frame, said motion image processing program product comprising the codes for:
(a) sequentially separating and outputting frame data forming said motion image data every one frame;
(b) conducting a decoding process for the frame data output by said code (a);
(c) detecting a first number of sets of the frame data maintained in a frame buffer used to maintain the frame data decoded by said code (b) and sequentially outputting from older frame data in a chronological order, and obtaining a frame data number D of sets of the frame data possible to further store in the frame buffer;
(d) calculating a quality parameter used to determine a decode quality at the decoding process conducted by said code (b), based on the frame data number D; and
(e) indicating said code (b) to update the quality parameter calculated by said code (d),
wherein said code (d) includes the codes for determining the quality parameter as a predetermined quality value minus the frame data number D, when the frame data number D is smaller than the first threshold and greater than the second threshold (second threshold<D<first threshold).

10. The computer-readable recording medium as claimed in claim 9, wherein said code (d) includes the codes for:
determining the quality parameter as a highest quality when the frame data number D showing an extra number of sets of the frame data that can be additionally maintained in the frame buffer is greater than a first threshold (D>first threshold), said frame data number obtained by said code (c); and
determining the quality parameter as a lowest quality when the frame data number is smaller than a second threshold (D<second threshold), said frame data number obtained said frame data number obtained by said code (c).

11. A computer-readable recording medium recorded with a motion image processing program product for causing a computer to reproduce motion image data being compressed by a digital motion image compressing method for conducting an image compressing process by information in a frame, said motion image processing program product comprising the codes for:
  (a) sequentially separating and outputting frame data forming said motion image data every one frame;
  (b) conducting a decoding process for the frame data output by said code (a);
  (c) detecting a first number of sets of the frame data maintained in a frame buffer used to maintain the frame data decoded by said code (b) and sequentially outputting from older frame data in a chronological order, and obtaining a frame data number D of sets of the frame data possible to further store in the frame buffer;
  (d) determining a next frame location to process, based on the frame data number D; and
  (e) indicating the frame location determined by said code (d), to said code (a),
  wherein said code (e) includes calculating a number of frames to drop as a predetermined number minus the frame data number D when the frame data number D is smaller than a second threshold (D<second threshold), and determining a next frame location by advancing by the number of frames.

12. The computer-readable recording medium as claimed in claim 9 or 11, wherein said digital motion image compressing method is a Motion JPEG 2000 method.

13. A motion image processing method for reproducing motion image data being compressed by a digital motion image compressing method for conducting an image compressing process by information in a frame, said motion image processing method comprising the steps of:
  (a) sequentially separating and outputting frame data forming said motion image data every one frame;
  (b) conducting a decoding process for the frame data output by said step (a);
  (c) detecting a first number of sets of the frame data maintained in a frame buffer used to maintain the frame data decoded by said step (b) and sequentially outputting from older frame data in a chronological order, and obtaining a frame data number D of sets of the frame data possible to further store in the frame buffer;
  (d) calculating a quality parameter used to determine a decode quality at the decoding process conducted by said step (b), based on the frame data number D; and
  (e) indicating said step (b) to update the quality parameter calculated by said step (d),
  wherein said code (d) includes the steps of determining the quality parameter as a predetermined quality value minus the frame data number D, when the frame data number is smaller than the first threshold and greater than the second threshold (second threshold<D<first threshold).

14. The motion image processing method as claimed in claim 13, wherein said step (d) further includes the steps of:
  determining the quality parameter as a highest quality when the frame data number D showing an extra number of sets of the frame data that can be additionally maintained in the frame buffer is greater than a first threshold (D>first threshold), said frame data number obtained by said step (c); and
  determining the quality parameter as a lowest quality when the frame data number is smaller than a second threshold (D<second threshold), said frame data number obtained said frame data number obtained by said step (c).

15. A motion image processing method for reproducing motion image data being compressed by a digital motion image compressing method for conducting an image compressing process by information in a frame, said motion image processing method comprising the steps of:
  (a) sequentially separating and outputting frame data forming said motion image data every one frame;
  (b) conducting a decoding process for the frame data output by said step (a);
  (c) detecting a first number of sets of the frame data maintained in a frame buffer used to maintain the frame data decoded by said step (b) and sequentially outputting from older frame data in a chronological order, and obtaining a frame data number D of sets of the frame data possible to further store in the frame buffer;
  (d) determining a next frame location to process, based on the frame data number D; and
  (e) indicating the frame location determined by said step (d), to said step (a),
  wherein said code (e) includes calculating a number of frames to drop as a predetermined number minus the frame data number D when the frame data number D is smaller than a second threshold (D<second threshold), and determining a next frame location by advancing by the number of frames.

16. The motion image processing method as claimed in claim 13 or 15, wherein said digital motion image compressing method is a Motion JPEG 2000 method.

\* \* \* \* \*